(12) United States Patent
Watanabe

(10) Patent No.: US 8,376,490 B2
(45) Date of Patent: Feb. 19, 2013

(54) IMAGE FORMING APPARATUS, IMAGE FORMING METHOD, AND RECORDING MEDIUM

(75) Inventor: Jun Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 13/225,936

(22) Filed: Sep. 6, 2011

(65) Prior Publication Data

US 2012/0062630 A1 Mar. 15, 2012

(30) Foreign Application Priority Data

Sep. 15, 2010 (JP) ................................. 2010-206607

(51) Int. Cl.
  *B41J 29/38* (2006.01)
(52) U.S. Cl. ................................. 347/9; 347/10; 347/12
(58) Field of Classification Search ................ 347/9, 10, 347/12
  See application file for complete search history.

(56) References Cited

U.S. PATENT DOCUMENTS

| 7,789,475 B2 | 9/2010 | Morishita et al. |
| 7,819,492 B2 | 10/2010 | Watanabe et al. |
| 2005/0225576 A1 | 10/2005 | Shoji |

FOREIGN PATENT DOCUMENTS

| JP | 2005-301423 | 10/2005 |
| JP | 2009218682 | * 8/2006 |
| JP | 2009-286112 | 12/2009 |
| JP | 2009286112 | * 12/2009 |

* cited by examiner

*Primary Examiner* — Julian Huffman
(74) *Attorney, Agent, or Firm* — IPUSA, PLLC

(57) ABSTRACT

An image forming apparatus includes a driving part driving a recording head; a signal generation part generating a common driving signal; and a transfer part transferring image data and control data to the driving part. The driving part includes a storage part capturing mask pattern transfer data to mask a predetermined one or more of different driving signals of the common driving signal provided by the signal generation part, the mask pattern transfer data being included in the control data; and a latching part latching the mask pattern transfer data, generating a signal to mask the common driving signal, and selectively performing one of control operations other than latching on the stored mask pattern transfer data, based on the combination of the value of the mask pattern transfer data and the value of a mask pattern transfer clock signal, when the latching part is caused to enter a latching state.

10 Claims, 24 Drawing Sheets

FIG.4 RELATED ART

| CLOCK MCK | DATA MD | LATCH MLn | OPERATION |
|---|---|---|---|
| ↑ | X | H | HOLD (DATA SHIFT) |
| X | L | L | LATCH |
| X | H | L | RESET (ALL-H) |

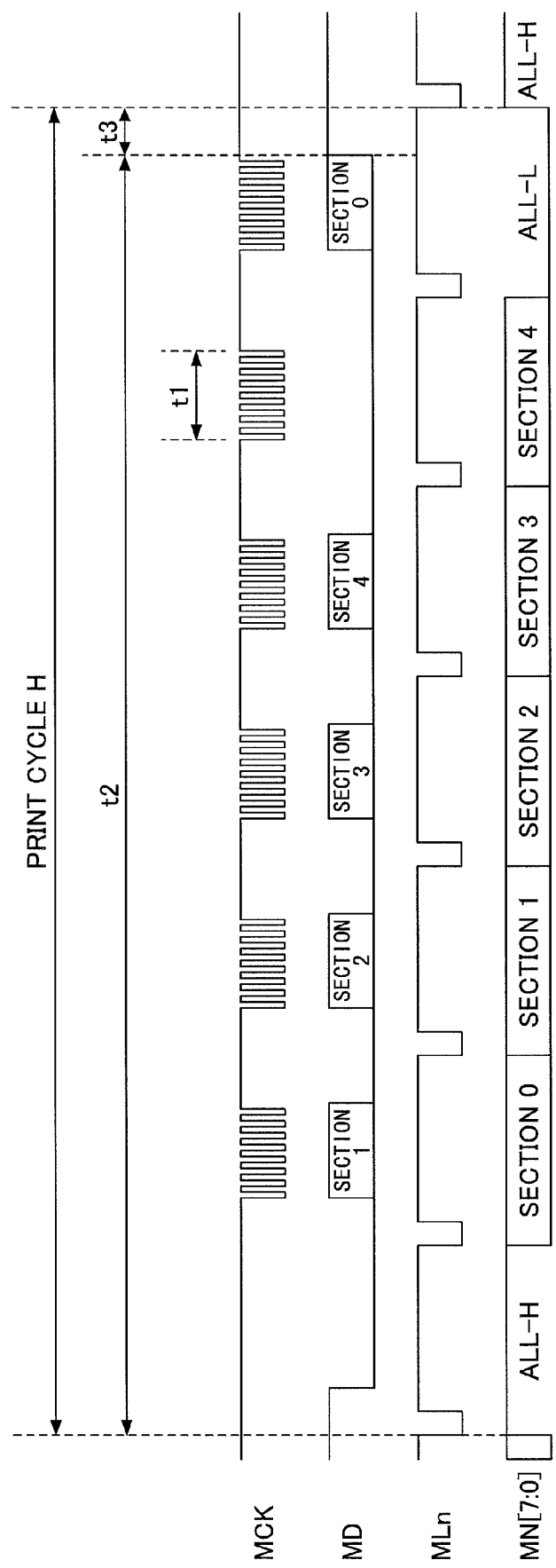

FIG.10

| CLOCK MCK | DATA MD | LATCH MLn | OPERATION |
|---|---|---|---|
| ↑ | X | H | HOLD (DATA SHIFT) |
| L | X | L | LATCH |
| H | L | L | RESET (ALL-L) |
| H | H | L | RESET (ALL-H) |

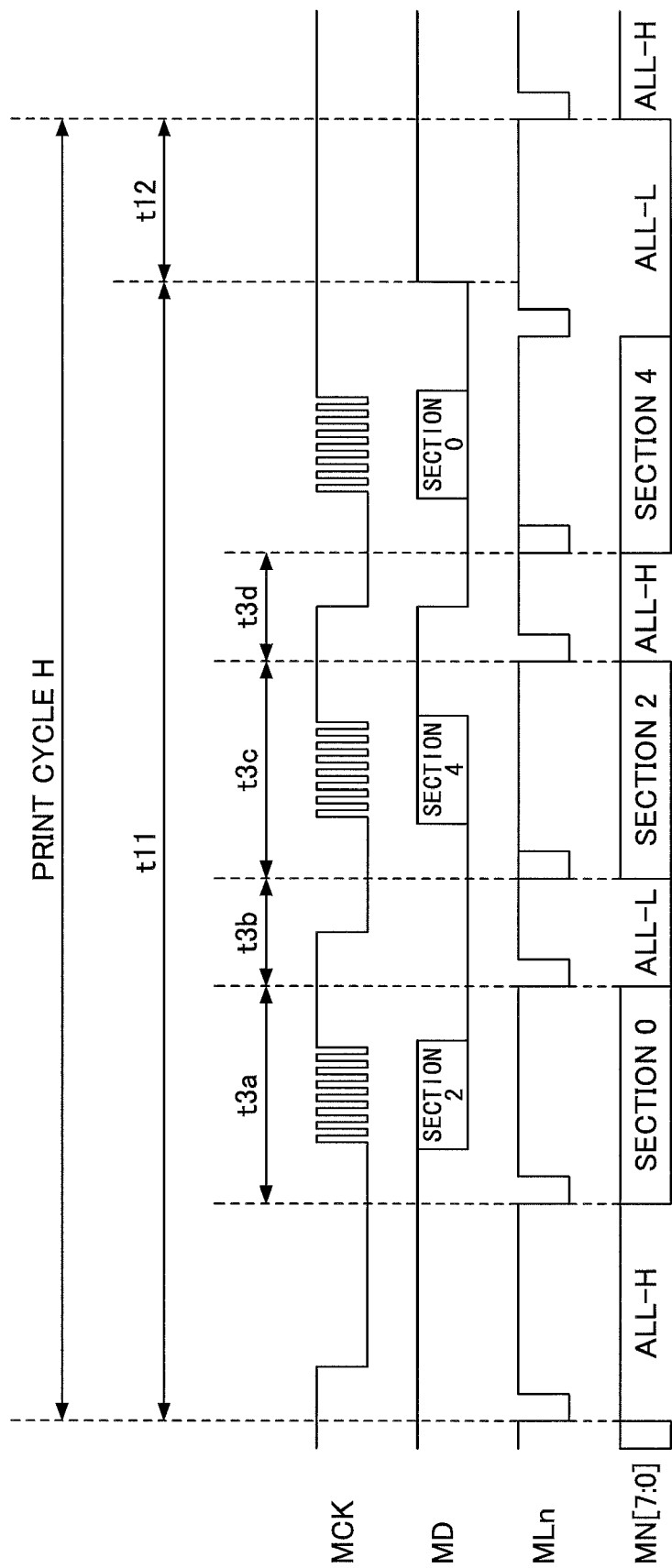

FIG.15

| CLOCK MCK | DATA MD | LATCH MLn | OPERATION |
|---|---|---|---|
| ↑ | X | H | HOLD (DATA SHIFT) |
| L | H | L | LATCH |
| H | L | L | RESET (ALL-L) |
| H | H | L | RESET (ALL-H) |
| L | L | L | PARALLEL TRANSFER MODE |

FIG.18

| CLOCK MCK | DATA MD | LATCH MLn | OPERATION |
|---|---|---|---|
| ↑ | X | H | HOLD (DATA SHIFT) |
| L | L | L | LATCH (MNi=H) |
| L | H | L | LATCH (MNi=L) |
| H | L | L | RESET (ALL-MNi) |
| H | H | L | RESET (ALL-H) |

IMAGE FORMING APPARATUS, IMAGE FORMING METHOD, AND RECORDING MEDIUM

CROSS-REFERENCE TO RELATED APPLICATION

The present application is based upon and claims the benefit of priority of Japanese Patent Application No. 2010-206607, filed on Sep. 15, 2010, the entire contents of which are incorporated herein by reference.

BACKGROUND OF THE INVENTION

1. Field of the Invention

The present invention relates to an image forming apparatus having a recording head in which multiple nozzles for ejecting liquid droplets and an actuator for causing the liquid droplets to be ejected from the multiple nozzles are formed and forming an image by causing the liquid droplets to be ejected from the multiple nozzles based on image data, and to an image forming method using a recording head in which multiple nozzles for ejecting liquid droplets and an actuator for causing the liquid droplets to be ejected from the multiple nozzles are formed and forming an image by causing the liquid droplets to be ejected from the multiple nozzles based on image data.

2. Description of the Related Art

Inkjet recording apparatuses have recording heads for respective colors mounted on a carriage. Multiple nozzles for ejecting ink are formed in the recording heads. The recording apparatuses form images by ejecting ink while causing the carriage to perform scanning in directions perpendicular to a direction in which a recording medium is conveyed. In the case of forming images in the recording apparatuses, head driving signals and control data for causing actuator parts to form an image are transferred from a control part on the apparatus body side to drivers on the recording head side. A common transfer system is serial data transfer. The head driving signals are signals to drive the actuator parts provided in the recording heads.

The control data transferred to the recording heads include image data and head driving signal masking signals. The image data determine kinds of ink droplets ejected from the respective nozzles. The head driving signal masking signals mask the head driving signals to generate driving waveforms for causing the recording heads of the respective colors to eject ink liquid droplets corresponding to the kinds of ink droplets.

Japanese Laid-Open Patent Application No. 2009-286112 describes an image forming apparatus that transfers data from a control part on the body side to recording heads.

A description is given, with reference to FIG. 1 through FIG. 4, of the image forming apparatus described in Japanese Laid-Open Patent Application No. 2009-286112.

FIG. 1 is a diagram illustrating an image forming apparatus that causes data to be transferred from a control part to recording heads.

Referring to FIG. 1, an image forming apparatus 10 includes a control part 11 provided on the apparatus body side and multiple recording heads 13 provided in a carriage 12.

In the image forming apparatus 10, firmware that controls hardware is contained in a read-only memory (ROM) 14. According to the image forming apparatus 10, in response to reception of a print job (image data) from a host personal computer (host PC) 20, a central processing unit (CPU) 21 causes the image data to be stored in a random access memory (RAM) 15, and causes a main scanning control part 16 to move the carriage 12 to a position above a recording medium. A recording head control part 30 transfers data including the image data contained in the RAM 15 to recording head driving parts 40 in conjunction with the position information of the carriage received from a main scanning encoder 17. The recording head driving parts 40 drive the recording heads 13 based on the data transferred from the recording head control part 30 to cause the recording heads 13 to eject ink droplets.

FIG. 2 is a diagram for illustrating data transfer from a recording head control part to a recording head driving part. The recording head driving part 30 generates a head driving signal (hereinafter, a common driving signal) Vcom, and outputs the common driving signal Vcom to the recording head driving part 40. In the case of FIG. 1, common driving signals from the recording head control part 30 to the respective recording head driving parts 40 may also be collectively referred to as "common driving signal Vcom." The recording head control part 30 transfers data including image data and a head driving waveform masking signal to mask the common driving signal Vcom to the recording head driving part 40.

The recording head control part 30 transfers image data corresponding to an image to be printed to a shift register 42 of the recording head driving part 40 with a transfer clock signal SCK of serial data SD1 and SD0 (hereinafter indicated as SD[1:0]). A latch part 43 of the recording head driving part 40 latches each register value of the shift register 42.

Further, the recording head control part 30 transfers mask pattern transfer data MD in serial data to a mask pattern shift register 46 of the recording head driving part 40 with a mask pattern transfer clock signal MCK. Further, the recording head control part 30 transfers a mask pattern transfer data latch signal MLn to a mask pattern latching part 47.

The mask pattern latching part 47 latches the mask pattern transfer data MD captured into the mask pattern shift register 46 with the mask pattern transfer data latch signal MLn, and switches head driving mask patterns MN[7:0] (head driving mask patterns MN0 through MN7) and outputs the head driving mask patterns MN[7:0] to a decoder 44. At this point, the timing of switching of the mask pattern is controlled by the operational timing of the mask pattern transfer data latch signal MLn.

The decoder 44 decodes and outputs the image data SD[1:0] and the head driving mask patterns MN[7:0]. A level shifter 45 shifts (converts) the level of a logic level voltage signal that is the output of the decoder 44 to a level that allows the operation of an analog switch 41. The analog switch 41 is turned ON/OFF (opened/closed) based on the output of the decoder 44 provided via the level shifter 45.

FIG. 3 is a diagram illustrating the mask pattern latching part 47. The mask pattern latching part 47 includes flip-flop circuits and multiplexers, which form a latch circuit. The mask pattern latching part 47 latches data in the mask pattern shift register 46 if the mask pattern transfer data latch signal MLn is LOW in level (hereinafter L-level) and the mask pattern transfer data MD is L-level, and if the mask pattern transfer data latch signal MLn is L-level and the mask pattern transfer data MD is high in level (hereinafter, H-level), all of the head driving mask patterns MN[7:0] are reset to H-level.

FIG. 4 illustrates a truth table of mask pattern serial transfer signals. The mask pattern latching part 47 determines whether to latch or reset data in the mask pattern shift register 46 based on the state of the mask pattern transfer data at the time when the mask pattern latching part 47 enters a latching state in response to the mask pattern transfer data latch signal MLn becoming L-level. If the mask pattern latching part 47 determines that the data in the mask pattern shift register 46 is to be reset, the mask pattern latching part 47 sets all of the head driving mask patterns MN[7:0] (mask pattern signals) to H-level (ALL-H), thereby resetting the data in the mask pattern shift register 46.

SUMMARY OF THE INVENTION

According to an aspect of the present invention, an image forming apparatus forming an image by causing liquid droplets to be ejected from a plurality of nozzles of a recording head based on image data includes a recording head driving part configured to drive the recording head; a common driving signal generation part configured to generate a common driving signal; and a data transfer part configured to transfer the image data and control data to the recording head driving part, wherein the recording head driving part includes a storage part configured to capture, in synchronization with a mask pattern transfer clock signal, mask pattern transfer data to mask a predetermined one or more of a plurality of different driving signals of the common driving signal provided by the common driving signal generation part, the mask pattern transfer data being included in the control data; and a mask pattern latching part configured to latch the mask pattern transfer data and generate a mask pattern signal to mask the common driving signal, and to selectively perform one of a plurality of control operations other than latching on the mask pattern transfer data stored in the storage part, based on a combination of a value of the mask pattern transfer data and a value of the mask pattern transfer clock signal, when the mask pattern latching part is caused to enter a latching state.

According to an aspect of the present invention, a method of forming an image by causing liquid droplets to be ejected from a plurality of nozzles of a recording head based on image data includes generating a common driving signal and providing a recording head driving part configured to drive the recording head with the generated common driving signal; transferring the image data and control data to the recording head driving part; capturing, in synchronization with a mask pattern transfer clock signal, mask pattern transfer data to mask a predetermined one or more of a plurality of different driving signals of the common driving signal, the mask pattern transfer data being included in the control data, and storing the captured mask pattern transfer data in a storage part of the recording head driving part; latching the mask pattern transfer data and generating a mask pattern signal to mask the common driving signal; and selectively performing one of a plurality of control operations other than latching on the mask pattern transfer data stored in the storage part, based on a combination of a value of the mask pattern transfer data and a value of the mask pattern transfer clock signal, when a latching state is entered.

According to an aspect of the present invention, a non-transitory computer-readable recording medium in which a program for causing a computer to execute a method of forming an image by causing liquid droplets to be ejected from a plurality of nozzles of a recording head based on image data is recorded is provided, where the method includes generating a common driving signal and providing a recording head driving part configured to drive the recording head with the generated common driving signal; transferring the image data and control data to the recording head driving part; capturing, in synchronization with a mask pattern transfer clock signal, mask pattern transfer data to mask a predetermined one or more of a plurality of different driving signals of the common driving signal, the mask pattern transfer data being included in the control data, and storing the captured mask pattern transfer data in a storage part of the recording head driving part; latching the mask pattern transfer data and generating a mask pattern signal to mask the common driving signal; and selectively performing one of a plurality of control operations other than latching on the mask pattern transfer data stored in the storage part, based on a combination of a value of the mask pattern transfer data and a value of the mask pattern transfer clock signal, when a latching state is entered.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 4 illustrates a truth table of mask pattern serial transfer signals;

FIGS. 5A and 5B are timing charts of signals illustrating cases of conventional mask pattern serial transfer;

FIG. 10 illustrates a truth table of signals of the mask pattern latching part according to the first embodiment;

FIGS. 12A and 12B are timing charts of signals illustrating other timings of data transfer from the recording head control part to the recording head driving part according to the first embodiment;

FIG. 15 illustrates a truth table of signals of the mask pattern latching part according to the second embodiment;

FIG. 18 illustrates a truth table of signals of the mask pattern latching part according to the third embodiment.

DETAILED DESCRIPTION OF THE PREFERRED EMBODIMENTS

The above-described mask pattern latching part 47 of Japanese Laid-Open Patent Application No. 2009-286112 determines whether to latch or reset data in the mask pattern shift register 46 with the two lines of the mask pattern transfer data MD and the mask pattern transfer data latch signal MLn when starting a latching operation. Therefore, the operation of the mask pattern latching part 47 at the time when the mask pattern latching part 47 starts a latching operation cannot be other than latching or ALL-H reset (ALL-H).

Therefore, for example, if it is desired that all of the head driving mask patterns MN[7:0] be L-level (hereinafter, ALL-L), such mask pattern transfer data MD as to set data in the mask pattern shift register 46 to ALL-L has to be transferred with the mask pattern transfer clock signal MCK.

Figure 1:
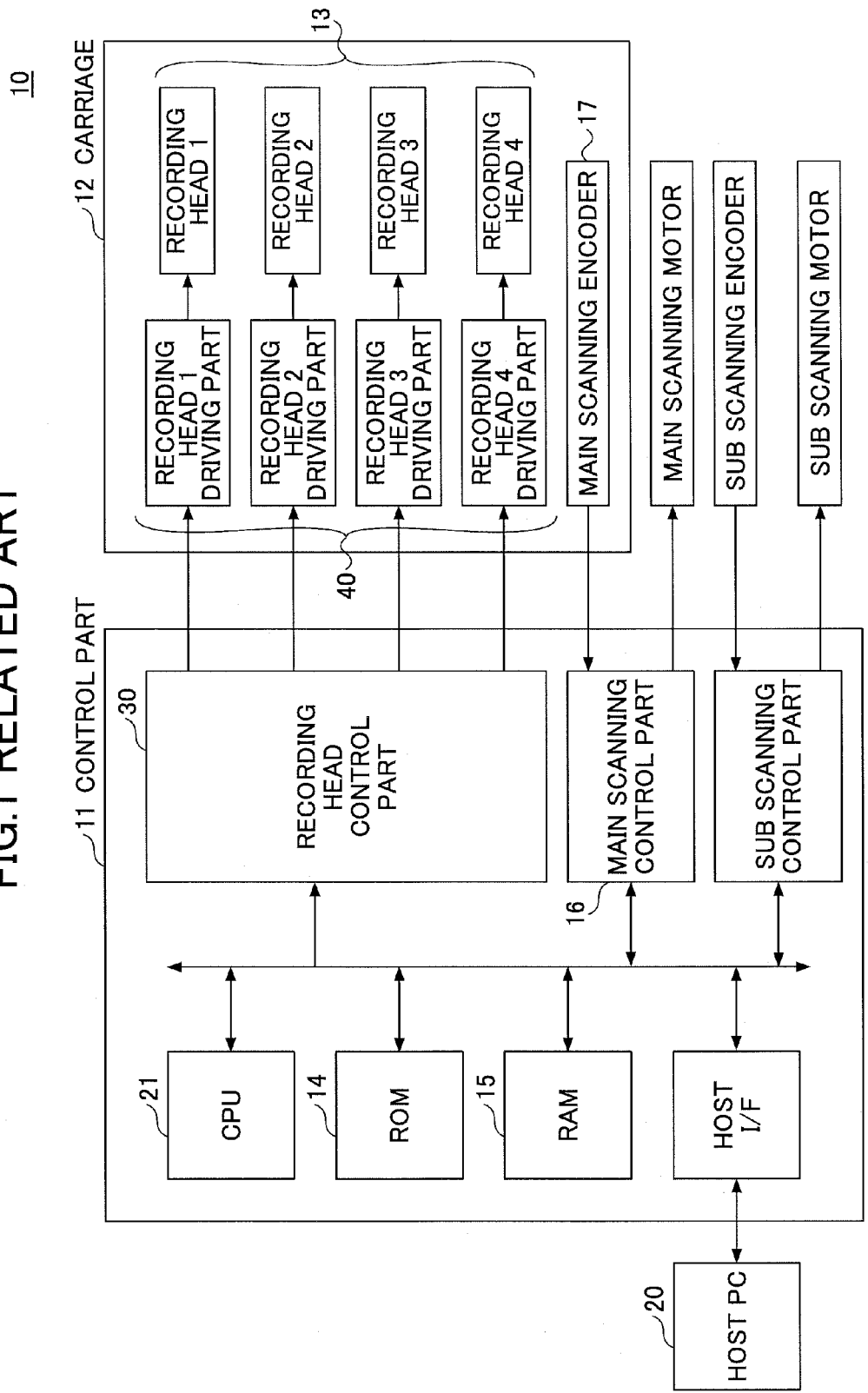
FIG. 1 is a block diagram illustrating an image forming apparatus in which data are transferred from a control part to a recording head.
Figure 2:
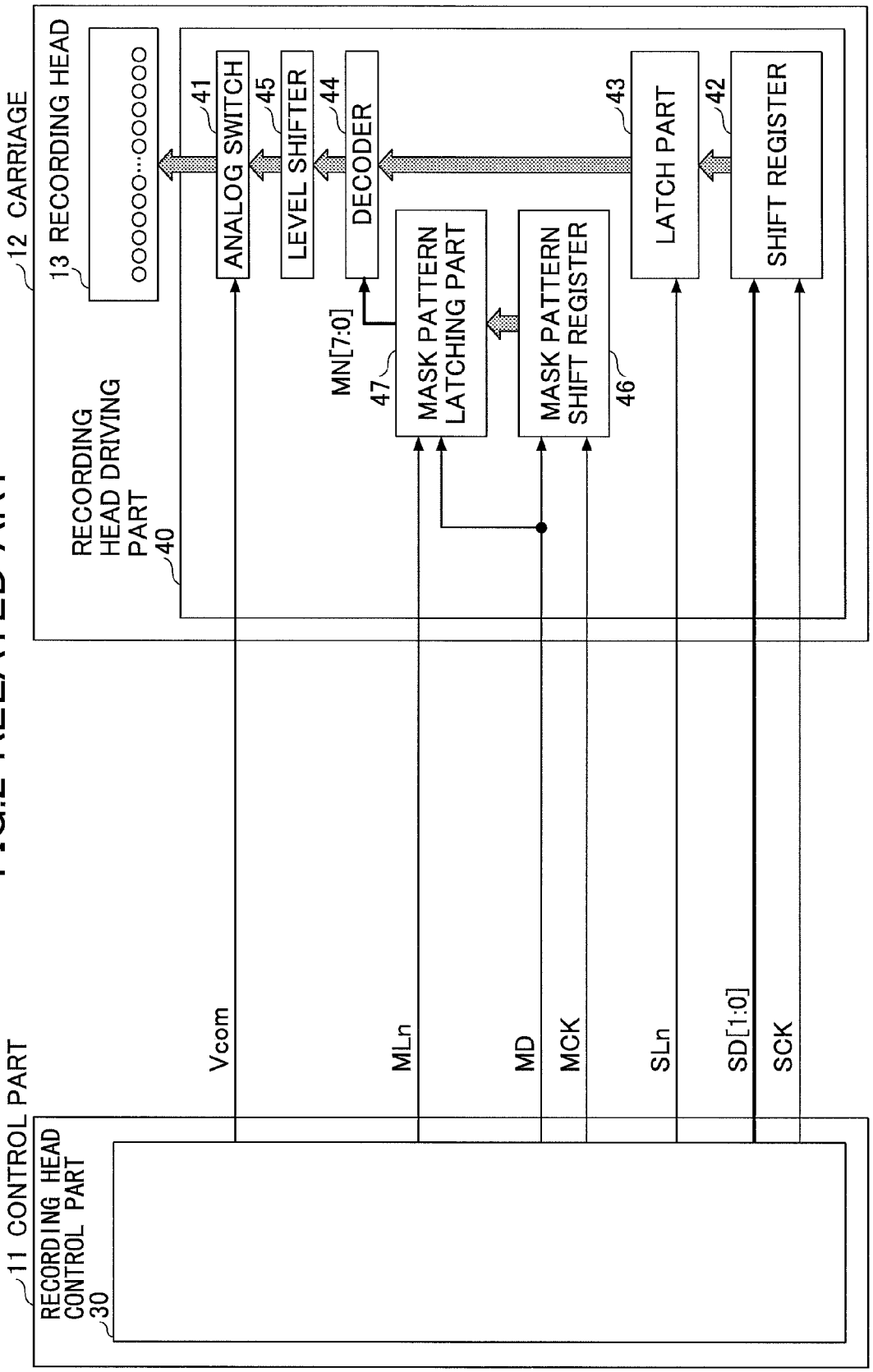
FIG. 2 is a block diagram illustrating a data transfer from a recording head control part to a recording head driving part.
Figure 3:
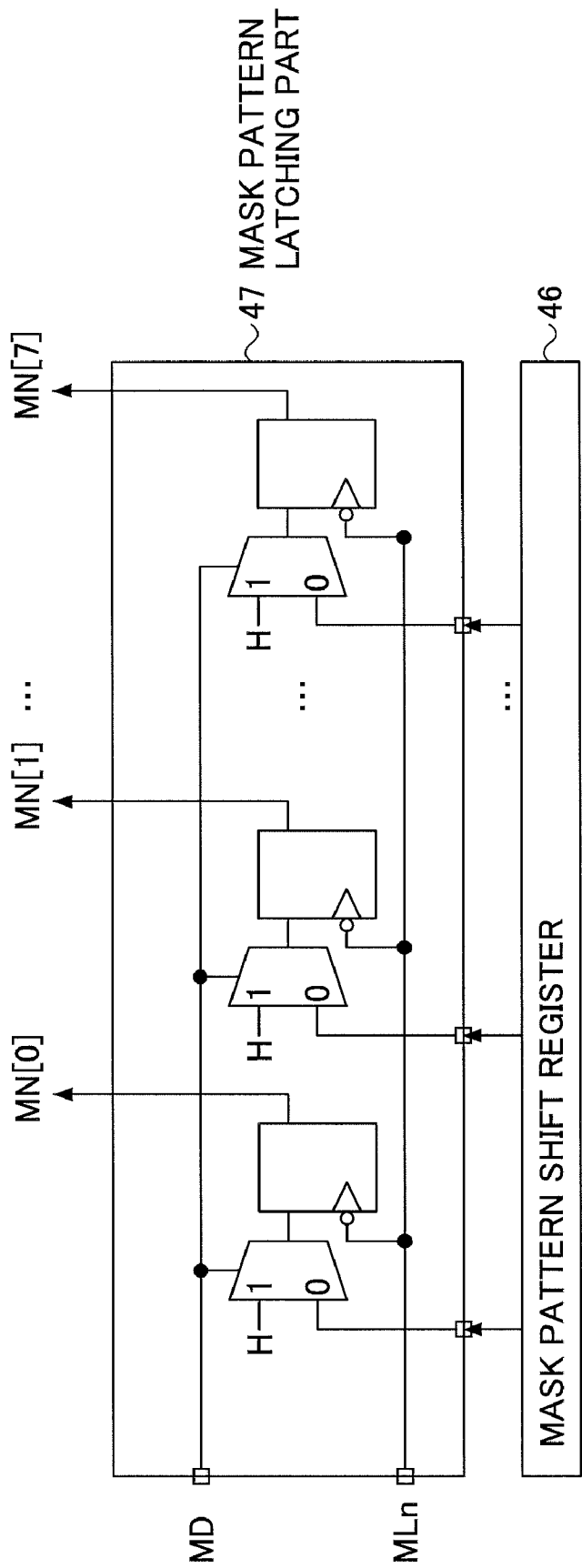
FIG. 3 is a diagram illustrating a mask pattern latching part.
Figure 5A:
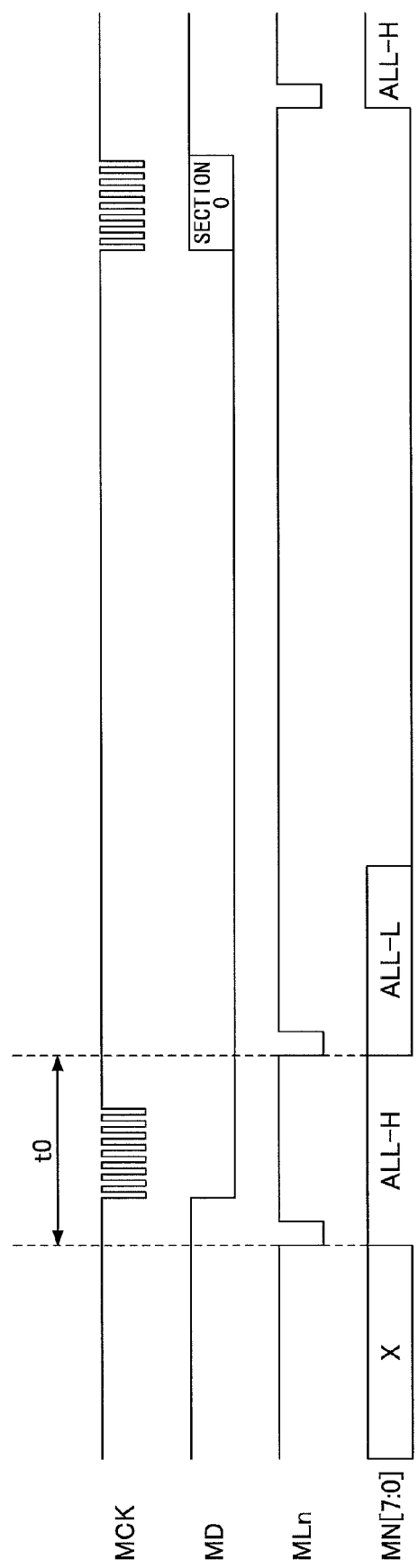

FIGS. 5A and 5B are timing charts of signals of the conventional mask pattern serial transfer.

FIG. 5A illustrates the case of initializing the head driving mask patterns MN[7:0] to ALL-H and then setting the head driving mask patterns MN[7:0] to ALL-L in order to raise the common driving signal Vcom through up to a reference potential. According to the image forming apparatus described in Japanese Laid-Open Patent Application No. 2009-286112, it is not possible to shorten (reduce) Period t0 for setting the head driving mask patterns MN[7:0] to ALL-L illustrated in FIG. 5A.

Further, as illustrated in FIG. 5B, in the case of setting the head driving mask patterns MN[7:0] to ALL-L at the time of the completion of transferring the mask pattern transfer data MD, it is not possible to shorten Period t1 for setting the head driving mask patterns MN[7:0] to ALL-L as in FIG. 5A.

Therefore, in a single print cycle H, margin Period t3, which serves as a margin aside from Period t2 related to data transfer, is prevented from being sufficiently long. The print cycle H, which is a cycle in which the carriage 12 travels in the main scanning direction, depends on the traveling speed of the carriage 12. Therefore, if margin Period t3 for the print cycle H is insufficient, a variation in the traveling speed of the carriage 12 cannot be absorbed within margin Period t3, so that data may not be transferred properly. If data are not transferred properly, the recording heads 13 fail to eject ink droplets, thus resulting in a defective image.

According to an aspect of the present invention, it is possible to ensure a sufficient margin for a print cycle and to improve the stability of ejection of ink droplets in a data transfer from the apparatus body side to the recording head side.

According to an aspect of the present invention, an image forming apparatus and an image forming method are provided that ensure a sufficient margin for a print cycle and increase the stability of ejection of ink droplets in a data transfer from the apparatus body side to the recording head side.

According to an aspect of the present invention, in the combination of three kinds of signals (a clock signal, a data signal, and a latch signal) serially transferred from the apparatus body side to the recording head side in an image forming apparatus, a function to perform multiple control operations (resetting to ALL-H, resetting to ALL-L, etc.) in addition to shifting and latching data is provided, thereby reducing a data transfer period in a print cycle (print period).

A description is given below, with reference to FIG. 6 through FIGS. 19A and 19B, of embodiments of the present invention.

First Embodiment

Figure 6:
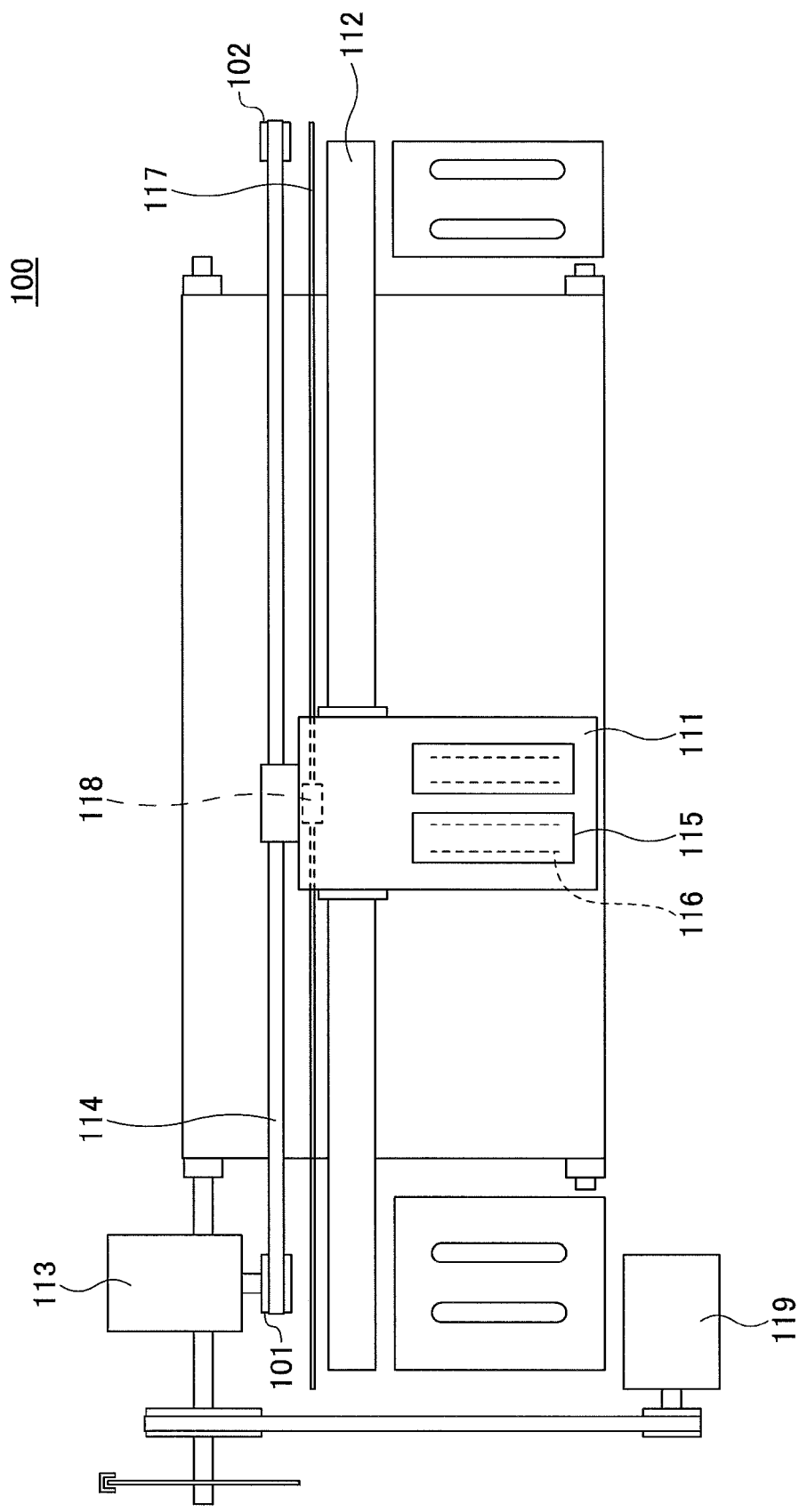
FIG. 6 is a diagram illustrating a configuration of an image forming apparatus according to a first embodiment.

FIG. 6 is a diagram illustrating a basic configuration of an image forming apparatus according to a first embodiment.

An image forming apparatus 100 according to this embodiment includes a carriage 111, a guide rod 112, a main scanning motor 113, and a timing belt 114. The carriage 111 is held by the guide rod 112 to perform scanning in the main scanning direction via the timing belt 114 wound with tension around a driving pulley 101 rotated by the main scanning motor 113 and a driven pulley 102.

Recording heads 115 that eject color ink droplets of, for example, yellow (Y), cyan (C), magenta (M), and black (K) are mounted on the carriage 111. (In FIG. 6, only two of the recording heads 115 are illustrated for convenience of graphical representation.) The recording heads 115 are configured to eject respective color inks from ink ejection nozzles 116 arranged in the recording heads 115. In the image forming apparatus 100, an image is formed on a recording medium by causing ink droplets to be ejected from the ink ejection nozzles 116 at desired positions while causing the carriage 111 to travel (move) in the main scanning direction.

The position information of the carriage 111 may be obtained by increasing or decreasing a count by an encoder sensor 118 fixed to the carriage 111 traveling and reading patterns recorded at equal intervals on an encoder sheet 117 fixed to a housing (not graphically illustrated).

In the image forming apparatus 100, it is possible to form an image of a band having a width equal to the length of the nozzle arrays formed by the ink ejection nozzles 116 with the traveling of the carriage 111 in the main scanning direction and a single ink ejecting operation. Upon completion of formation of an image for one band, the image forming apparatus 100 drives a sub scanning motor 119 to move the recording medium in the sub scanning direction, and repeats the operation to form another image for one band. Thereby, the image forming apparatus 100 according to this embodiment forms an image at a desired location on the recording medium.

Figure 7:
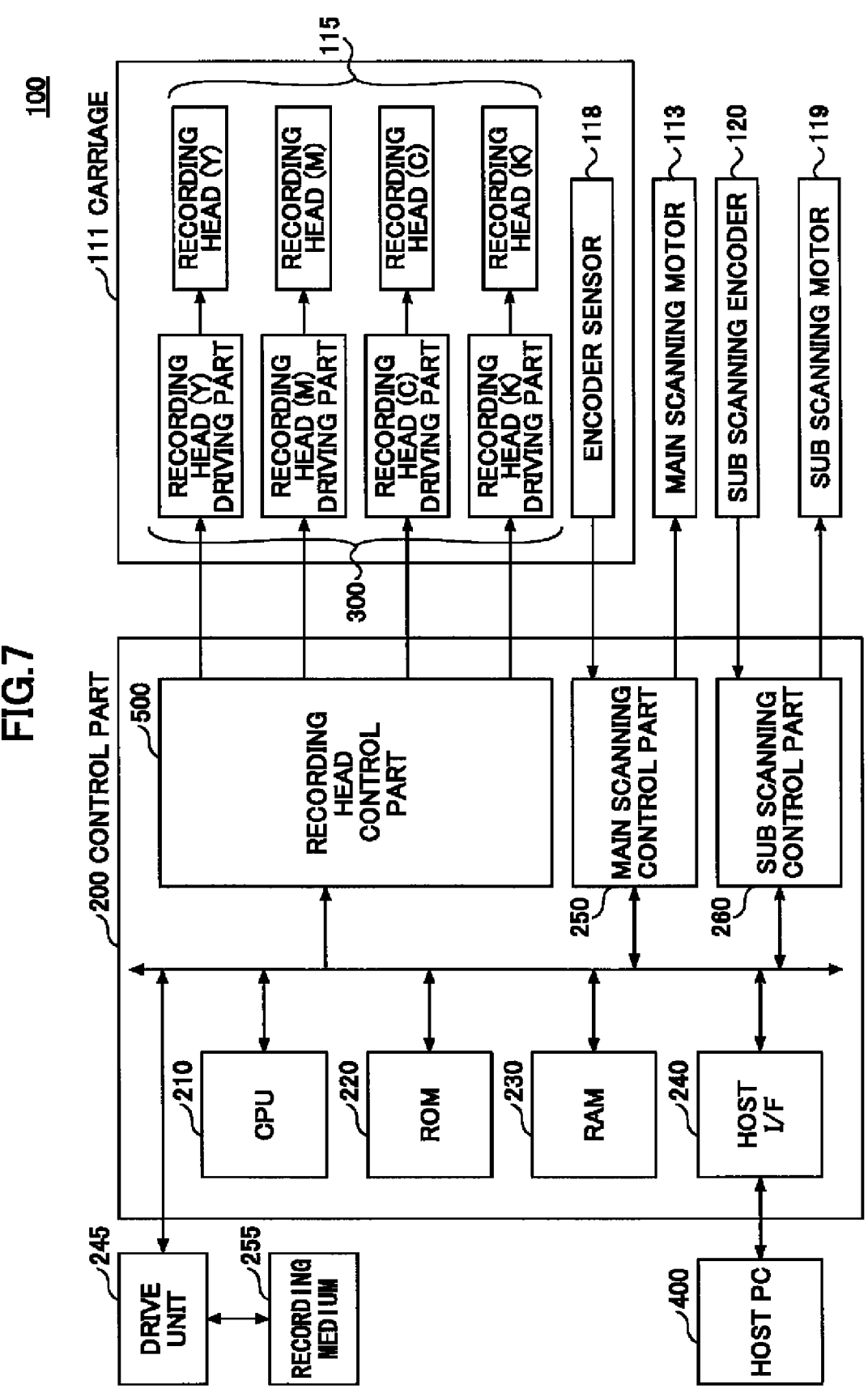
FIG. 7 is a block diagram illustrating a functional configuration of the image forming apparatus according to the first embodiment.

FIG. 7 is a block diagram illustrating a functional configuration of the image forming apparatus 100 according to the first embodiment. The image forming apparatus 100 of this embodiment includes a control part 200 provided on the apparatus body side. The control part 200 controls the image forming apparatus 100 and transfers data to recording head driving parts 300 (described below).

According to this embodiment, the image forming apparatus 100 is connected to a host computer (host PC) 400 via a network or the like. Upon reception of image data created by the host computer 400, the control part 200 transfers the image data and data for causing an image corresponding to the image data to be formed to the recording head driving parts 300. The recording head driving parts 300 drive the corresponding recording heads 115 in accordance with the transfer data.

The control part 200 of this embodiment includes a CPU 210, a ROM 220, a RAM 230, a host interface (host I/F) 240, a main scanning control part 250, a sub scanning control part 260, and a recording head control part 500.

The CPU 210 controls the entire control part 200. Further, the CPU 210 reads a program contained in the ROM 220 and executes the read program. A program for implementing an image forming method according to an aspect of the present invention may also be contained in the ROM 220. The ROM 220 contains firmware that controls hardware and a driving signal to cause the recording heads 115 to be driven. This driving signal is a below-described common driving signal Vcom.

The RAM 230 stores image data received from the host computer 400. The host I/F 240 transmits data to and receives data from the host computer 400. The main scanning control part 250 controls the main scanning motor 113 in accordance with the output of the encoder sensor 118. The sub scanning control part 250 controls the sub scanning motor 119 in accordance with the output of a sub scanning encoder 120.

The recording head control part 500 transfers image data stored in the RAM 230 and the common driving signal Vcom to the recording head driving parts 300 in conjunction with the position information of the carriage 111 obtained (received) from the encoder sensor 118. Further, the recording head control part 500 transfers below-described control data as well to the recording head driving parts 300.

According to this embodiment, the carriage 111 includes the recording head driving parts 300 configured to drive the recording heads 115 provided for respective colors. The recording head driving parts 300 drive actuators 121 (FIG. 8) of the recording heads 115 based on the data transferred from the recording head control part 500 to cause ink droplets to be ejected from the recording heads 115.

Further, the program for implementing an image forming method according to an aspect of the present invention may also be provided via a recording medium 255 such as a CD-ROM, a USB memory, and an SD card. Upon loading of the recording medium 255 in which the program is recorded into a drive unit 245 of the image forming apparatus 100, the program is loaded into the RAM 230 via the drive unit 245. The CPU 210 implements functions related to the image forming apparatus 100 in accordance with the program loaded into the RAM 230. A suitable device that allows the loading of the program from the recording medium 255 may be used as the drive unit 245 depending on the type of the recording medium 255.

A description is given below, with reference to FIG. 8, of the recording head driving part 300 (any of the recording head driving parts 300 of FIG. 7) according to this embodiment.

Figure 8:
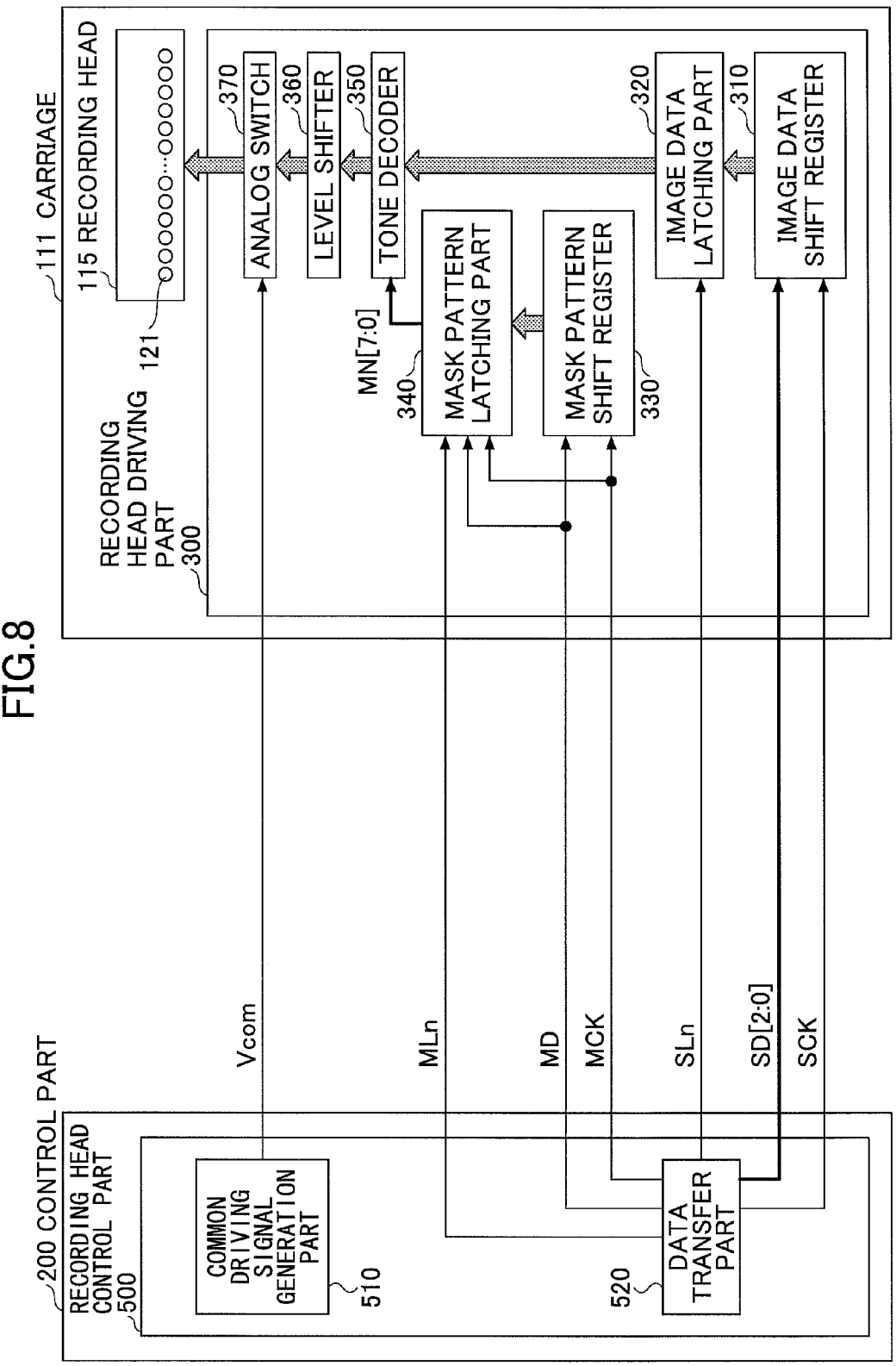
FIG. 8 is a block diagram illustrating a recording head driving part according to the first embodiment.

FIG. 8 is a diagram illustrating the recording head driving part 300 of the first embodiment. In FIG. 8, of the recording head driving parts 300 of respective colors provided in the carriage 111, one that drives the recording head 115 of a certain color is illustrated. According to this embodiment, the recording head driving parts 300 provided in the carriage 111 other than the recording head driving part 300 illustrated in FIG. 8 have the same configuration as the recording head driving part 300 illustrated in FIG. 8.

According to this embodiment, the recording head control part 500 includes a common driving signal generation part 510 and a data transfer part 520. The common driving signal generation part 510 generates a recording head driving signal formed of multiple different driving signals (pulse signals), and outputs the generated recording head driving signal to the recording head driving part 300. In the following description of this embodiment, the recording head driving signal is referred to as "common driving signal Vcom."

The print cycle of this embodiment refers to a period of time in which the recording head 115 ejects ink liquid droplets. For example, if the image forming apparatus 100 has a resolution of 300 dpi, the print cycle is one three-hundredths (1/300) of the period for the carriage 111 traveling one inch. That is, the print cycle depends on the traveling speed of the carriage 111. If there is a variation in the traveling speed of the carriage 111, the print cycle also varies for the variation.

The data transfer part 520 transfers image data and control data to the recording head driving part 300. The control data are data for causing the actuators 121 to be driven in accordance with the image data. The control data include, for example, a transfer shift clock signal SCK, a latch signal SLn, a mask pattern transfer clock signal MCK, mask pattern transfer data MD, and a mask pattern transfer data latch signal MLn, a description of which is given below.

A description is given below of signals output from the data transfer part 520 to the recording head driving part 300 according to this embodiment.

According to this embodiment, the data transfer part 520 outputs serial data SD2, SD1, and SD0 (hereinafter written as "serial data SD[2:0]"), the transfer shift clock signal SCK, the latch signal SLn, the mask pattern transfer clock signal MCK, the mask pattern transfer data MD, and the mask pattern transfer data latch signal MLn to the recording head driving part 300.

The serial data SD[2:0] are three-bit serial data. Image data are transferred as the serial data SD[2:0]. In the following description of this embodiment, the serial data SD[2:0] are referred to as "image data SD."

The transfer shift clock signal SCK is a transfer clock signal for transferring the image data SD. The image data SD are transferred from the data transfer part 520 to the recording head driving part 300 in synchronization with the transfer shift clock signal SCK. The latch signal SLn is a signal to command the latching of the image data SD.

The mask pattern transfer data MD are data for masking the common driving signal Vcom. The mask pattern transfer clock signal MCK is a clock signal for transferring the mask pattern transfer data MD. The mask pattern transfer data MD are transferred from the data transfer part 520 to the recording head driving part 300 in synchronization with the mask pattern transfer clock signal MCK.

The mask pattern transfer data latch signal MLn is a signal to determine the timing of latching the mask pattern transfer data MD captured in a mask pattern shift register 330 described below. According to this embodiment, a mask pattern latching part 340 is in a latching state (in which the mask pattern latching part 340 is allowed to perform latching) when the mask pattern transfer data latch signal MLn is L-level and is in a data shifting state when the mask pattern transfer data latch signal MLn is H-level.

Next, a description is given of the recording head driving part 300 according to this embodiment. According to this embodiment, the recording head driving part 300 includes an image data shift register 310, an image data latching part 320, the mask pattern shift register 330, the mask pattern latching part 340, a tone decoder 350, a level shifter 360, and an analog switch 370.

The image data shift register 310 captures the image data SD in synchronization with the transfer shift clock signal SCK. The image data latching part 320 latches the image data in accordance with the latch signal SLn.

The mask pattern shift register 330 captures the mask pattern transfer data MD in synchronization with the mask pattern transfer clock signal MCK.

The mask pattern latching part 340 controls the mask pattern transfer data MD captured in the mask pattern shift register 330, and generates head driving mask pattern signals MN[7:0] (head driving mask pattern signals MN0 through MN7). In the following description of this embodiment, the head driving mask pattern signals MN[7:0] are referred to as "mask pattern signals MN[7:0]." The mask pattern latching part 340 outputs the generated mask pattern signals MN[7:0] to the tone decoder 350.

According to this embodiment, three kinds of data, that is, the mask pattern transfer clock signal MCK, the mask pattern transfer data MD, and the mask pattern transfer data latch signal MLn, are input to the mask pattern latching part 340. According to this embodiment, the mask pattern latching part 340 switches control of the mask pattern transfer data MD based on the combination of these three kinds of data.

For example, the mask pattern latching part 340 may selectively perform one of multiple control operations other than latching based on the combination of the values of the mask pattern transfer clock signal MCK and the mask pattern transfer data MD in the latching state when the mask pattern transfer data latch signal MLn is L-level. The multiple control operations include, for example, resetting the mask pattern signals MN[7:0] into the ALL-H state and resetting the mask pattern signals MN[7:0] into the ALL-L state. A description is given below of a configuration of the mask pattern latching part 340 of this embodiment.

The mask pattern signals MN[7:0] are two-bit signals to command the opening or closing of the analog switch 370 on an ink-droplet basis. According to this embodiment, when a mask pattern signal MN (any of the mask pattern signals MN[7:0]) corresponding to a desired driving signal (waveform) of the common driving signal Vcom is H-level, a driving signal provided to a corresponding one of the actuators 121 is masked. When a mask pattern signal MN (any of the mask pattern signals MN[7:0]) corresponding to a desired driving signal (waveform) of the common driving signal Vcom is L-level, a driving signal is provided to a corresponding one of the actuators 121 to cause a liquid droplet (ink droplet) to be ejected from the nozzle.

The tone decoder 350 decodes and outputs the image data SD and the mask pattern signals MN[7:0]. The level shifter 360 shifts (converts) the level of the logic level voltage signal of the tone decoder 350 to a level that allows the operation of the analog switch 370.

The analog switch 370 is turned ON/OFF based on the output of the tone decoder 350 provided via the level shifter 360. The analog switch 370 is connected to the individual electrodes of the actuators 121 of the recording head 115, and the common driving signal Vcom from the common driving signal generation part 510 is input to the analog switch 370. The actuators 121 of this embodiment are, for example, piezoelectric elements.

According to this embodiment, the analog switch 370 is controlled in accordance with the result of decoding the image data SD and the mask pattern signals MN[7:0] in the tone decoder 350. Thereby, desired driving signals of the common driving signal Vcom are elected and applied to the actuators 121. According to the image forming apparatus 100 of this embodiment, the driving of the actuators 121 of the recording head is controlled, thereby forming an image corresponding to the image data SD.

Figure 9:
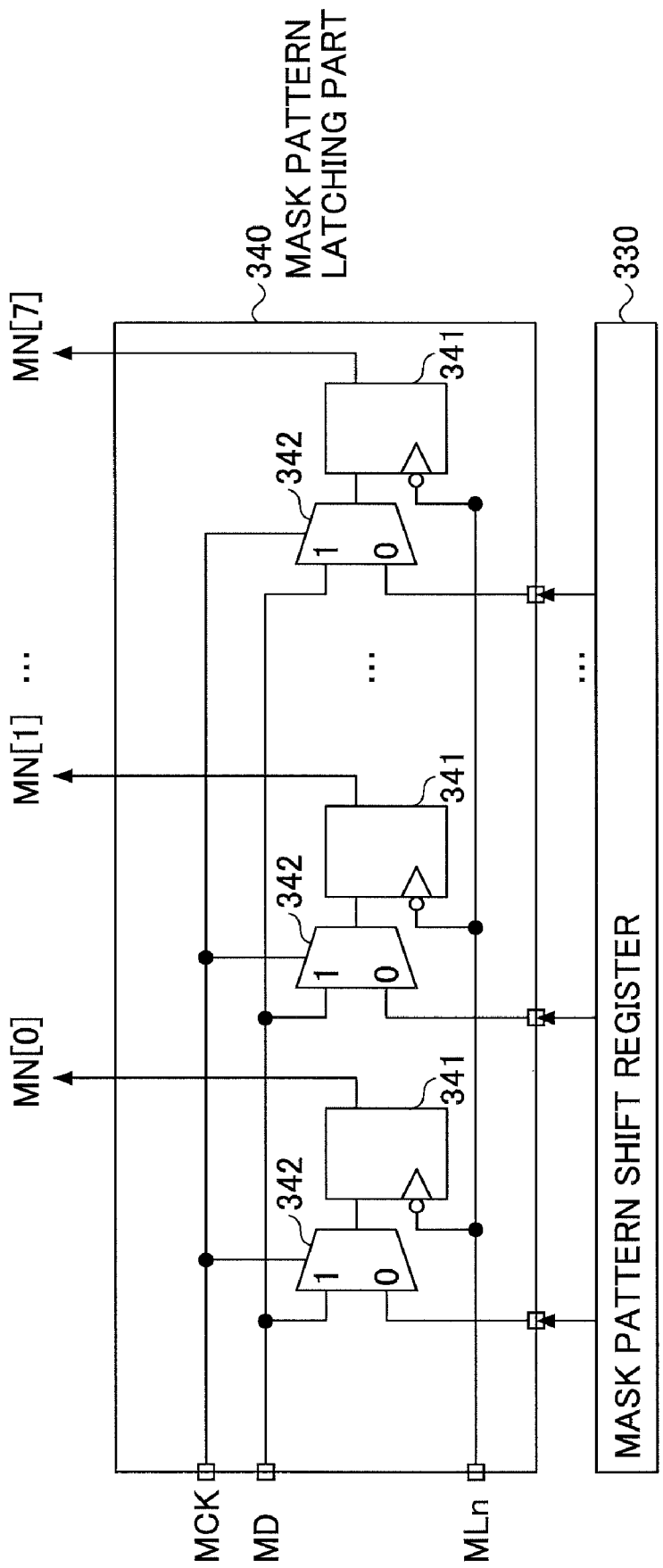
FIG. 9 is a diagram illustrating a mask pattern latching part according to the first embodiment.

A description is given below, with reference to FIG. 9, of a configuration of the mask pattern latching part 340 according to this embodiment. FIG. 9 is a diagram illustrating the mask pattern latching part 340 of the first embodiment.

According to this embodiment, the mask pattern latching part 340 includes flip-flop circuits 341 and multiplexers 342. The output of the mask pattern shift register 330 and the mask pattern transfer data MD are provided to the inputs of the multiplexers 342. The multiplexers 342 output the mask pattern transfer data MD when the mask pattern transfer clock signal MCK is H-level.

The flip-flop circuits 341 latch the data of the mask pattern shift register 330 when the mask pattern transfer data latch signal MLn is L-level and the mask pattern transfer clock signal MCK is L-level. Further, the flip-flop circuits 341 latch the data of the mask pattern transfer data MD when the mask pattern transfer data latch signal MLn is L-level and the mask pattern transfer clock signal MCK is H-level.

FIG. 10 illustrates a truth table of signals of the mask pattern latching part 340 of the first embodiment.

According to this embodiment, when entering a latching state in response to the mask pattern transfer data latch signal MLn (MLn=L-level), the mask pattern latching part 340 performs latching if the value of the mask pattern transfer clock signal MCK is different from its value at the time of initialization. Further, when entering the latching state, the mask pattern latching part 340 performs resetting, which is a control operation other than latching, if the value of the mask pattern transfer clock signal MCK is the same as its value at the time of initialization.

Further, according to this embodiment, the mask pattern latching part 340 is configured to perform one selected from multiple control operations (other than latching) based on the value of the mask pattern transfer data MD in the case where the value of the mask pattern transfer clock signal MCK is the same as its value at the time of initialization in the latching state.

The initialization refers to setting all of the mask pattern signals MN[7:0] to initial values after cancellation of a power reset of the image forming apparatus. According to this embodiment, the initial values of all of the mask pattern signals MN[7:0] are H-level, and the value of the mask pattern transfer clock signal MCK at the time of initialization is H-level.

Therefore, the mask pattern latching part 340 latches the mask pattern transfer data MD when the mask pattern transfer data latch signal MLn is L-level and the mask pattern transfer clock signal MCK is L-level. Further, the mask pattern latching part 340 resets the mask pattern transfer data MD when the mask pattern transfer data latch signal MLn is L-level and the mask pattern transfer clock signal MCK is H-level.

Further, according to this embodiment, the mask pattern latching part 340 resets all of the mask pattern signals MN[7:0] to L-level (ALL-L) if the status of the mask pattern transfer data MD is L-level at the time of resetting. Further, the mask pattern latching part 340 resets all of the mask pattern signals MN[7:0] to H-level (ALL-H) if the status of the mask pattern transfer data MD is H-level at the time of resetting.

That is, according to this embodiment, the mask pattern latching part 340 determines whether to latch the mask pattern transfer data MD or reset the mask pattern signals MN[7:0] based on the status of the mask pattern transfer clock signal MCK at the time of a latching operation (when the mask pattern transfer data latch signal MLn is L-level).

Further, according to this embodiment, the mask pattern latching part 340 determines whether to cause the mask pattern signals MN[7:0] to be ALL-L or ALL-H based on the status of the mask pattern transfer data MD and resets the mask pattern signals MN[7:0] at the time of resetting.

Figure 11A:
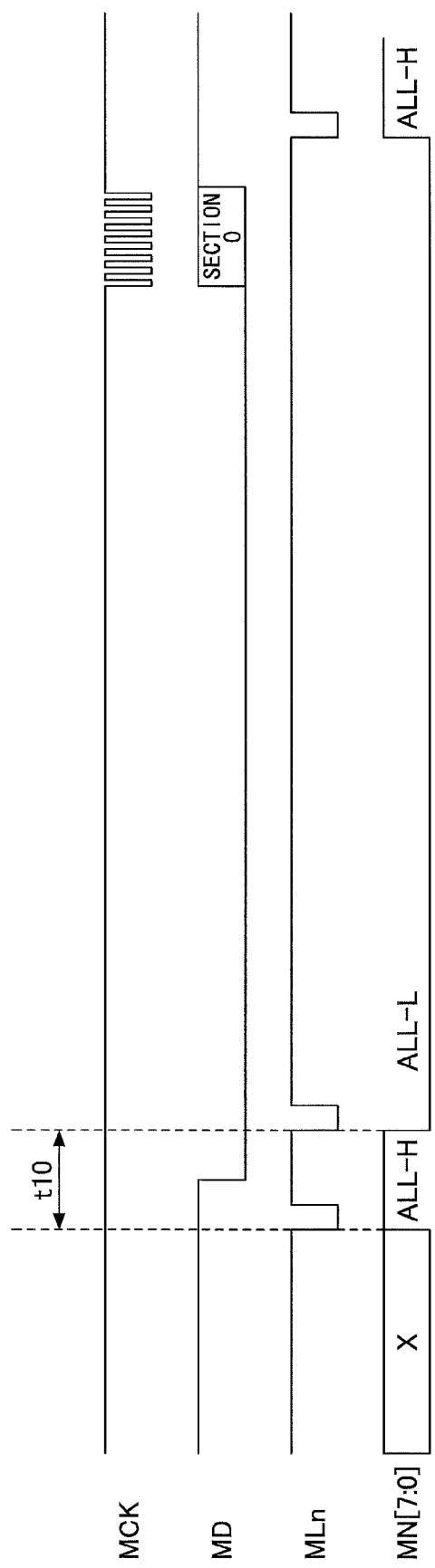
FIGS. 11A and 11B are timing charts of signals illustrating timings of data transfer from a recording head control part to the recording head driving part according to the first embodiment.
Figure 11B:
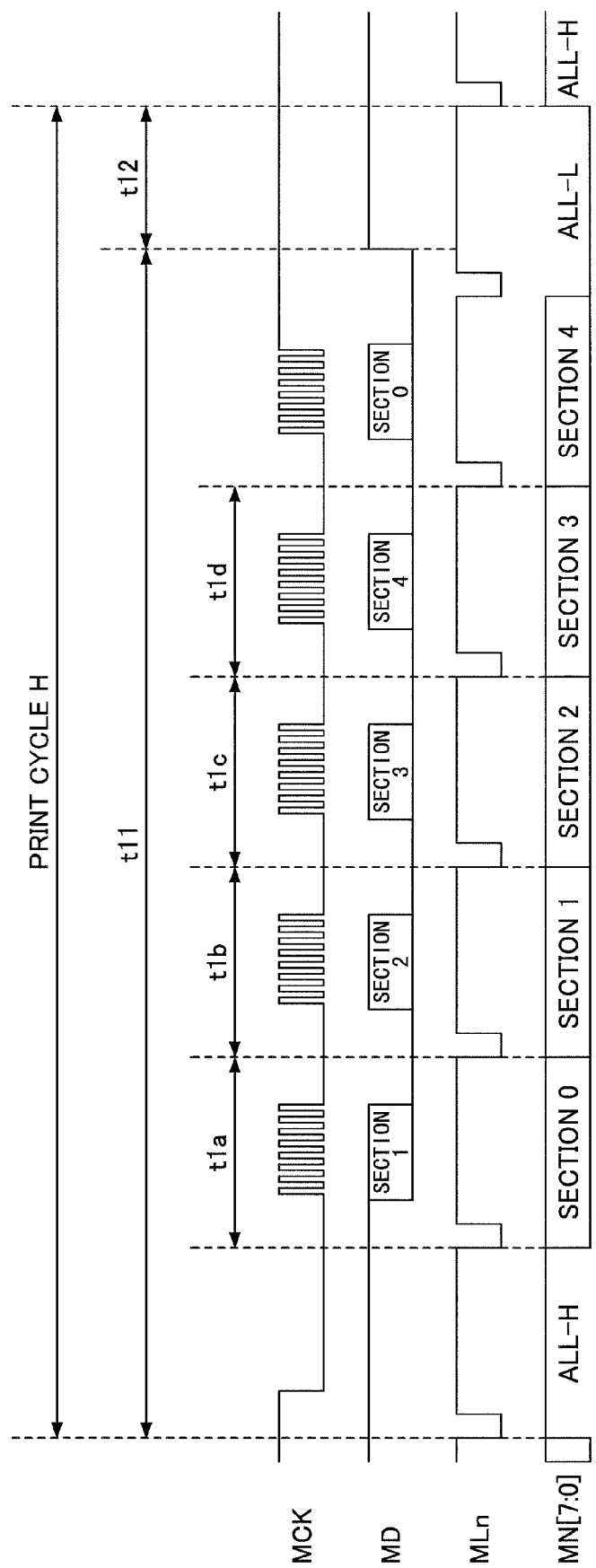

FIGS. 11A and 11B are timing charts of signals illustrating timings of data transfer from the recording head control part 500 to the recording head driving part 300. FIG. 11A is a timing chart of signals at the time of initializing the mask pattern signals MN[7:0], and FIG. 11B is a timing chart of signals at the time of transferring data.

According to this embodiment, as illustrated in FIG. 11A, after being reset (initialized) to ALL-H, the mask pattern signals MN[7:0] are set to ALL-L, and the common driving signal Vcom is raised up to a reference potential. According to this embodiment, the mask pattern signals MN[7:0] may be reset to ALL-L in switching the setting (state) of the mask pattern signals MN[7:0] from ALL-H to ALL-L.

This eliminates the necessity of transferring the mask pattern transfer data MD for causing the mask pattern signals MN[7:0] to be ALL-L.

Accordingly, it is possible to shorten Period (Time Period) t10 before the mask pattern signals MN[7:0] are switched to ALL-L from ALL-H.

Next, a description is given, with reference to FIG. 11B, of a transfer of data from the recording head control part 500 to the recording head driving part 300 according to this embodiment.

Section 1 data through Section 4 data captured in the mask pattern shift register 330 in Period (Time Period) t1a through Period (Time Period) t1d, respectively, are latched when the mask pattern transfer data latch signal MLn becomes L-level, and are output as the mask pattern signals MN[7:0] with a delay of one period. For example, Section 1 data captured in the mask pattern shift register 330 in Period t1a are output as the mask pattern signals MN[7:0] in the next period, that is, Period t1b.

According to this embodiment, in the case of causing the mask pattern signals MN[7:0] to be ALL-L at the end of outputting the mask pattern signals MN[7:0] in the print cycle H, the mask pattern signals MN[7:0] may be so reset as to be ALL-L in accordance with the truth table illustrated in FIG. 10. Therefore, according to this embodiment, no period for transferring ALL-L data for causing the mask pattern signals MN[7:0] to be ALL-L (corresponding to Period t1 in FIG. 5B) is necessary.

Thus, according to this embodiment, it is possible to shorten Period t11 for transferring the mask pattern transfer data MD. Therefore, it is possible to increase margin Period t12 relative to the print cycle H, so that it is possible to flexibly accommodate a variation in the traveling speed of the carriage 111 in the main scanning direction.

According to this embodiment, when the mask pattern latching part 340 is in a latching state, the mask pattern latching part 340 performs a resetting operation if the value of the mask pattern transfer clock signal MCK is the same as its value at the time of initialization, and performs a latching operation if the value of the mask pattern transfer clock signal MCK is the inverted value of (a value of opposite level to) its value at the time of initialization. Therefore, it is possible to reduce signal transitions after initialization. Further, since the number of signal transitions is smaller than conventionally, it is possible to reduce operating-time power consumption.

Further, according to this embodiment, the mask pattern latching part 340 is caused to perform resetting at the end of the transfer of the mask pattern transfer data MD in the print cycle H. However, the reset function of the mask pattern latching part 340 may be used with other timing (at other times).

Figure 12A:
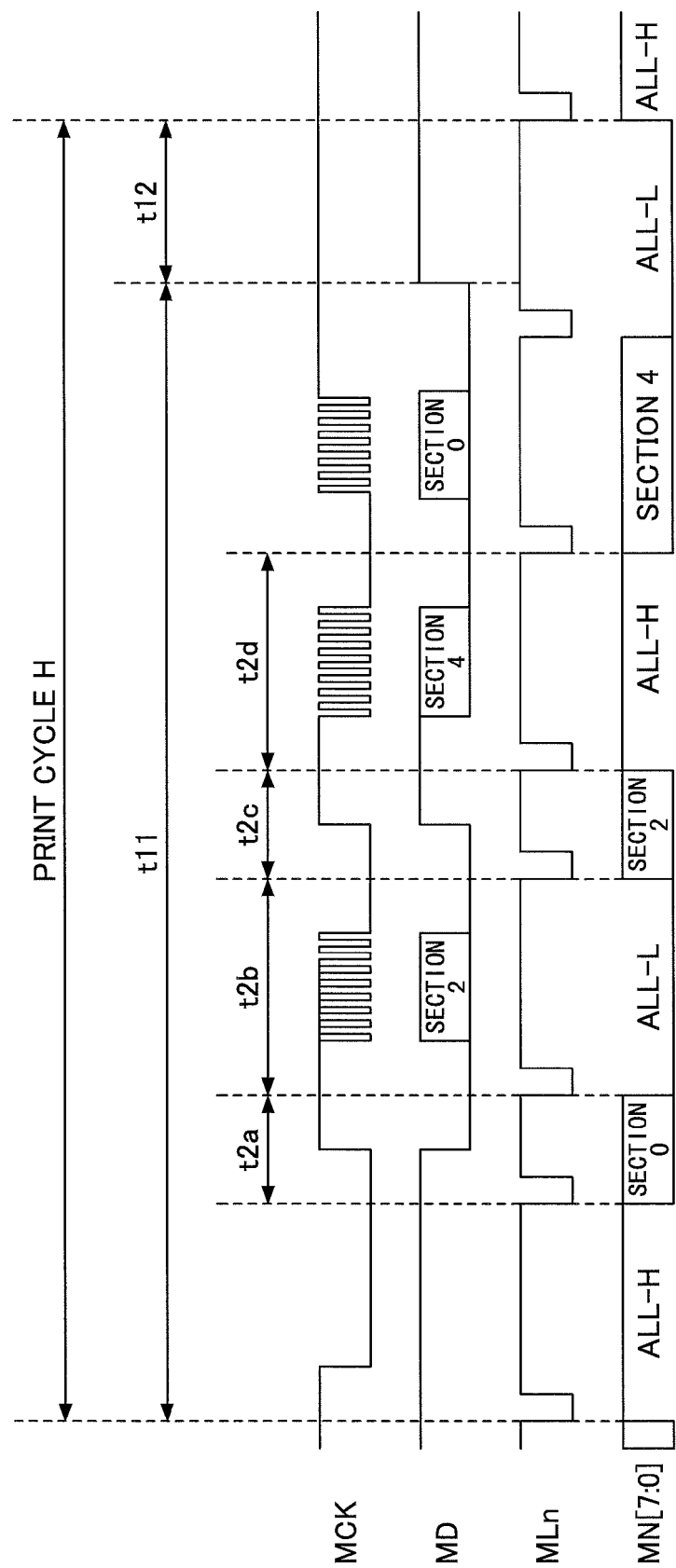

FIGS. 12A and 12B are timing charts of signals illustrating other timings of data transfer from the recording head control part 500 to the recording head driving part 300. FIG. 12A illustrates a case of data transfer, and FIG. 12B illustrates another case of data transfer.

In the case of FIG. 11B, Period t1a through Period t1d in which Section 0 data through Section 3 data are output, respectively, are longer than a period for transferring the mask pattern transfer data MD of the next section (eight pulses of the mask pattern transfer clock signal MCK).

Therefore, if Section 0 data, Section 1 data, Section 2 data, Section 3 data, or Section 4 data are equal to the ALL-L or ALL-H reset value, the resetting operation is applied to the section (whose data are equal to the ALL-L or ALL-H reset value).

Each of FIGS. 12A and 12B illustrates a case where Section 1 data are equal to the ALL-L value and Section 3 data are equal to the ALL-H value. In FIG. 12A, the mask pattern signals MN[7:0] are reset to ALL-L at the end of Period t2a for transferring Section 1 data. Further, the mask pattern signals MN[7:0] are reset to ALL-H at the end of Period t2c for transferring Section 3 data. Applying the resetting operation in such a manner makes it possible to shorten Period t2a, in which Section 1 data are to be transferred, and Period t3a, in which Section 3 data are to be transferred.

In the case of FIG. 12B, Section 2 data are transferred in Period t3a, in which Section 1 data are supposed to be transferred, thereby reducing Period tab, in which Section 2 data are supposed to be transferred. Further, Section 4 data are transferred in Period t3c, in which Section 3 data are supposed to be transferred, thereby reducing Period tad, in which Section 4 data are supposed to be transferred.

Preferably, which one of the transfer systems of FIGS. 12A and 12B is to be employed is determined by register settings in the recording head driving part 300.

As described above, according to this embodiment, it is possible to reduce a data transfer period in a print cycle and to ensure a sufficient margin period for the print cycle in transferring data from the apparatus body side to the recording head side. Accordingly, it is possible to absorb a variation in the traveling speed of the carriage 111 in this margin period, so that it is possible to improve the stability of ejection of ink droplets.

Second Embodiment

A description is given of a second embodiment of the present invention.

The second embodiment of the present invention is different from the first embodiment in that a function is provided to perform new (additional) control based on the status of the mask pattern transfer data MD in the latching state. Therefore, in the second embodiment, elements having the same functional configurations as those of the first embodiment are referred to by the same reference numerals, and a description thereof is omitted.

In the first embodiment, the status of the mask pattern transfer data MD may be either H-level or L-level in determining that latching be performed. (See FIG. 10.)

According to this embodiment, latching is performed when the mask pattern transfer clock signal MCK is L-level, the mask pattern transfer data latch signal MLn is L-level, and the status of the mask pattern transfer data MD is H-level. A parallel transfer of image data is selected when the mask pattern transfer clock signal MCK is L-level, the mask pattern transfer data latch signal MLn is L-level, and the status of the mask pattern transfer data MD is L-level.

According to the first embodiment, the image data are of eight gradations. If the number of gradations of image data is as large as eight, a serial transfer of data is performed between the recording head control part 500 and the recording head driving part 300 using the mask pattern transfer clock signal MCK, the mask pattern transfer data MD, and the mask pattern transfer data latch signal MLn.

Further, some image data are of a smaller number of gradations (for example, four gradations). If the number of gradations of image data is as small as four, the transfer system may be switched to parallel transfer to transfer the mask pattern signals MN[7:0] directly from the recording head control part 500 to the recording head driving part 300.

According to the conventional image forming apparatus, the transfer system is switched based on a signal to determine the transfer system input from an external terminal provided for switching the transfer system.

According to this embodiment, this signal to determine the transfer system is expressed by the combination of three kinds of signals, that is, the mask pattern transfer clock signal MCK, the mask pattern transfer data latch signal MLn, and the mask pattern transfer data MD.

Figure 13:
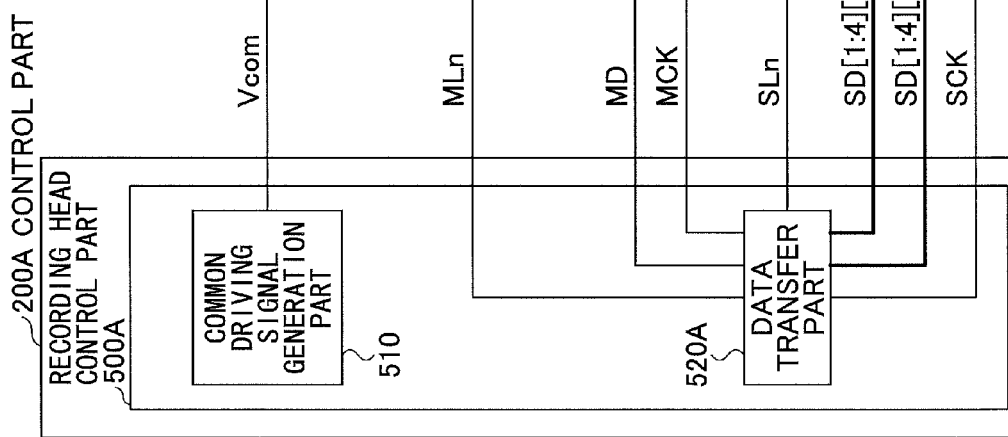
FIG. 13 is a block diagram illustrating a recording head driving part according to a second embodiment.

FIG. 13 is a block diagram illustrating a recording head driving part according to the second embodiment.

According to this embodiment, the image forming apparatus 100 includes a control part 200A. The control part 200A includes a recording head control part 500A. The recording head control part 500A includes a data transfer part 520A. If the transfer system is parallel transfer, the data transfer part 520A transfers image data using image data SD[1:4][1:0] and uses image data SD[1:4][2], which is a signal not used for transferring the image data, for transferring mask pattern signals MN[3:0].

According to this embodiment, the carriage 111 includes recording head driving parts 300A, of which one is illustrated in FIG. 13. The recording head driving part 300A includes an image data shift register 310A. The image data shift register 310A captures the image data SD[1:4][1:0] and the mask pattern signals MN[3:0] in the case of parallel transfer.

According to this embodiment, the recording head driving part 300A includes a mask pattern latching part 340A. The mask pattern latching part 340A determines whether to latch data in the mask pattern shift register 330 in accordance with the transfer system.

Figure 14:
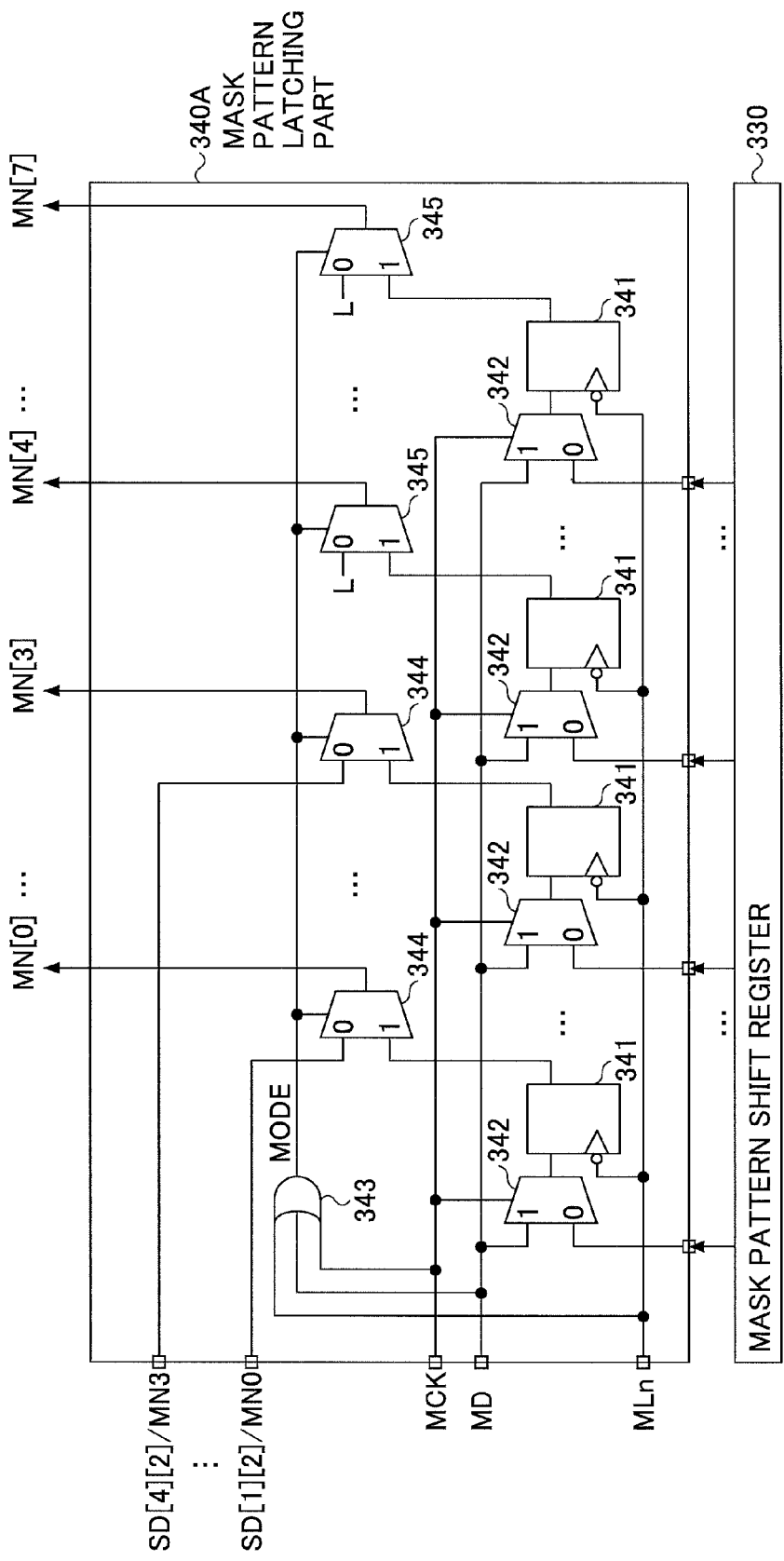
FIG. 14 is a diagram illustrating a mask pattern latching part according to the second embodiment.

FIG. 14 is a diagram illustrating the mask pattern latching part 340A according to the second embodiment. According to this embodiment, the mask pattern latching part 340A includes an OR circuit 343 and multiplexers 344 and 345 in addition to the flip-flop circuits 341 and the multiplexers 342.

The OR circuit 343 is configured to switch the transfer system. The mask pattern transfer clock signal MCK, the mask pattern transfer data latch signal MLn, and the mask pattern transfer data MD are input to the OR circuit 343. The output of the OR circuit 343 (hereinafter referred to as "MODE signal") is provided as a selection signal to the multiplexers 344 and 345.

The multiplexers 344 have respective first inputs provided with the outputs of the corresponding flip-flop circuits 341 (connected to the multiplexers 344). The multiplexers 344 have respective second inputs provided with the image data SD[1:4][2].

According to this embodiment, in the mask pattern latching part 340A, terminals SD[1][2]/MN[0] through SD[4][2]/MN[3] are shared by the image data SD[1:4][2] and the mask pattern signals MN[3:0]. The mask pattern signals MN[3:0] are input to the multiplexers 334.

The multiplexers 345 have respective first inputs provided with the outputs of the corresponding flip-flop circuits 341 (connected to the multiplexers 345). The multiplexers 345 have respective second inputs fixed to L-level.

If the MODE signal is H-level, the multiplexers 344 and 345 select the outputs of the flip-flop circuits 341. If the MODE signal is L-level, the multiplexers 344 select the image data SD[1:4][2] as outputs and the multiplexers 345 output L-level.

FIG. 15 is a truth table of signals of the mask pattern latching part 340A according to the second embodiment.

According to this embodiment, the mask pattern latching part 340A selects parallel transfer if each of the three signals of the mask pattern transfer clock signal MCK, the mask pattern transfer data latch signal MLn, and the status of the mask pattern transfer data MD is L-level.

Figure 16A:
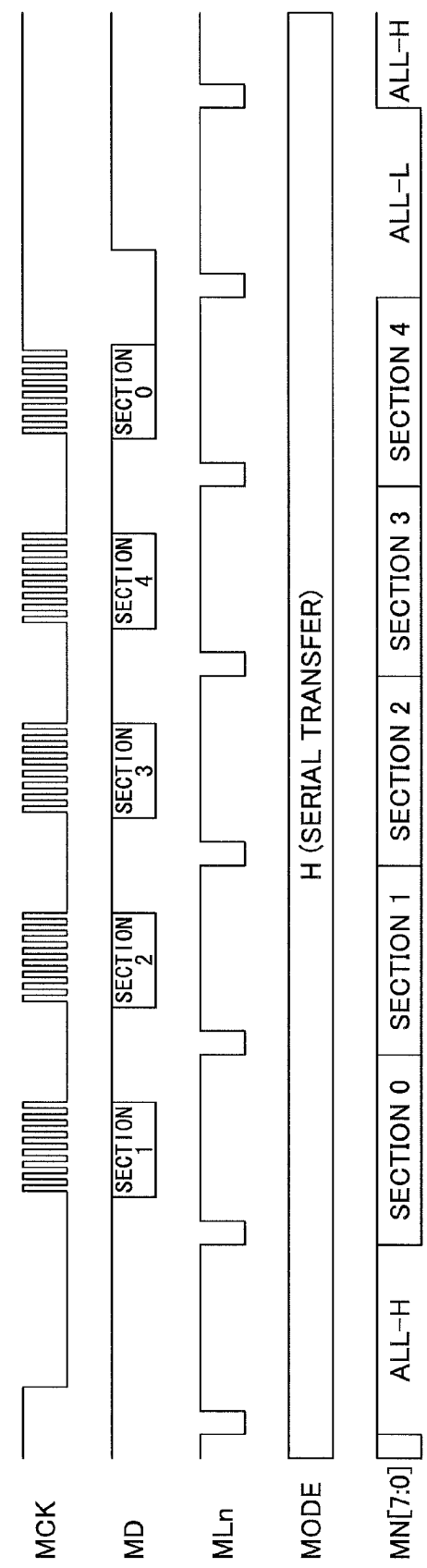
FIGS. 16A and 16B are timing charts of signals illustrating timings of data transfer from a recording head control part to the recording head driving part according to the second embodiment.
Figure 16B:
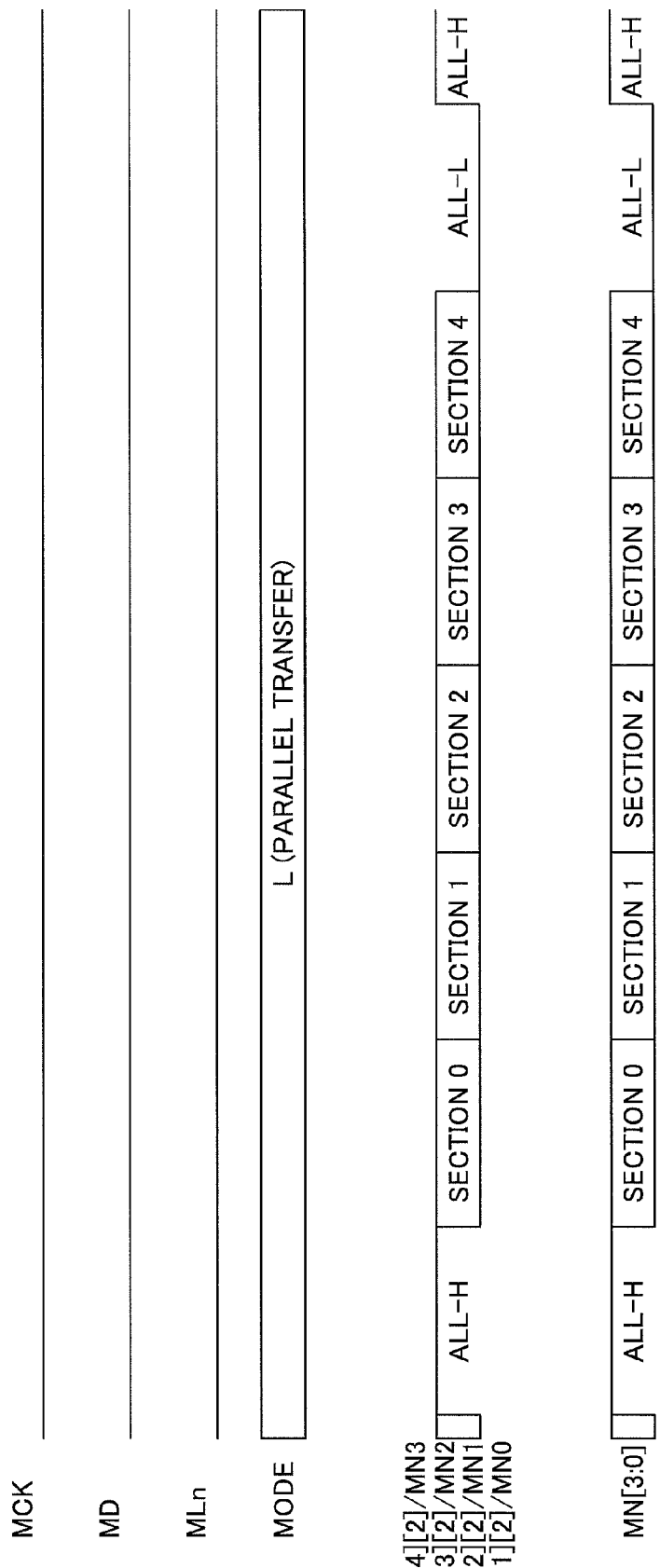

FIGS. 16A and 16B are timing charts of signals illustrating timing of data transfer from the recording head control part 500A to the recording head driving part 300A according to the second embodiment. FIG. 16A illustrates a case of serial transfer, and FIG. 16B illustrates a case of parallel transfer.

In the case of serial transfer, at least one of the mask pattern transfer clock signal MCK, the mask pattern transfer data latch signal MLn, and the status of the mask pattern transfer data MD is H-level. Accordingly, the MODE signal is H-level. In this case, the multiplexers 344 and 345 output the outputs of the flip-flop circuits 341 as the mask pattern signals MN[7:0].

In the case of parallel transfer, each of the mask pattern transfer clock signal MCK, the mask pattern transfer data latch signal MLn, and the status of the mask pattern transfer data MD is L-level. Accordingly, the MODE signal is L-level. In this case, the multiplexers 344 select and output the image data SD[1:4][2], and the multiplexers 345 select L-level.

In the case of parallel transfer, the mask pattern signals MN[3:0] are transferred using signal lines for transferring the image data SD[1:4][2]. Accordingly, the mask pattern latching part 340A captures the mask pattern signals MN[3:0] from the signal lines for the image data SD[1:4][2], and outputs these mask pattern signals MN[3:0] to the tone decoder 350 (FIG. 13).

According to this embodiment, the transfer system may be selected by the control part 200A based on, for example, the number of gradations of image data.

Thus, according to this embodiment, the transfer system may be switched based on the combination of the mask pattern transfer clock signal MCK, the mask pattern transfer data latch signal MLn, and the mask pattern transfer data MD according to the number of gradations of image data. Therefore, according to this embodiment, no external terminal for inputting the MODE signal to switch the transfer system is necessary, so that it is possible to prevent an increase in the size of the recording head driving part 300A and to prevent an increase in the number of signal lines between the control part 200A and the carriage 111.

Third Embodiment

A description is given below of a third embodiment according to the present invention. The third embodiment of the present invention is different from the first embodiment in that a function is provided to perform new (additional) control based on the status of the mask pattern transfer data MD in the latching state. Therefore, in the third embodiment, elements having the same functional configurations as those of the first embodiment are referred to by the same reference numerals, and a description thereof is omitted.

According to this embodiment, the inverted signal of (a signal of opposite level [status] to) the mask pattern transfer data MD at the time of latching (hereinafter referred to as "MNi signal") is stored. According to this embodiment, in the case of resetting except the case of resetting to ALL-H, resetting is performed to the value (level) of the MNi signal.

Figure 17:
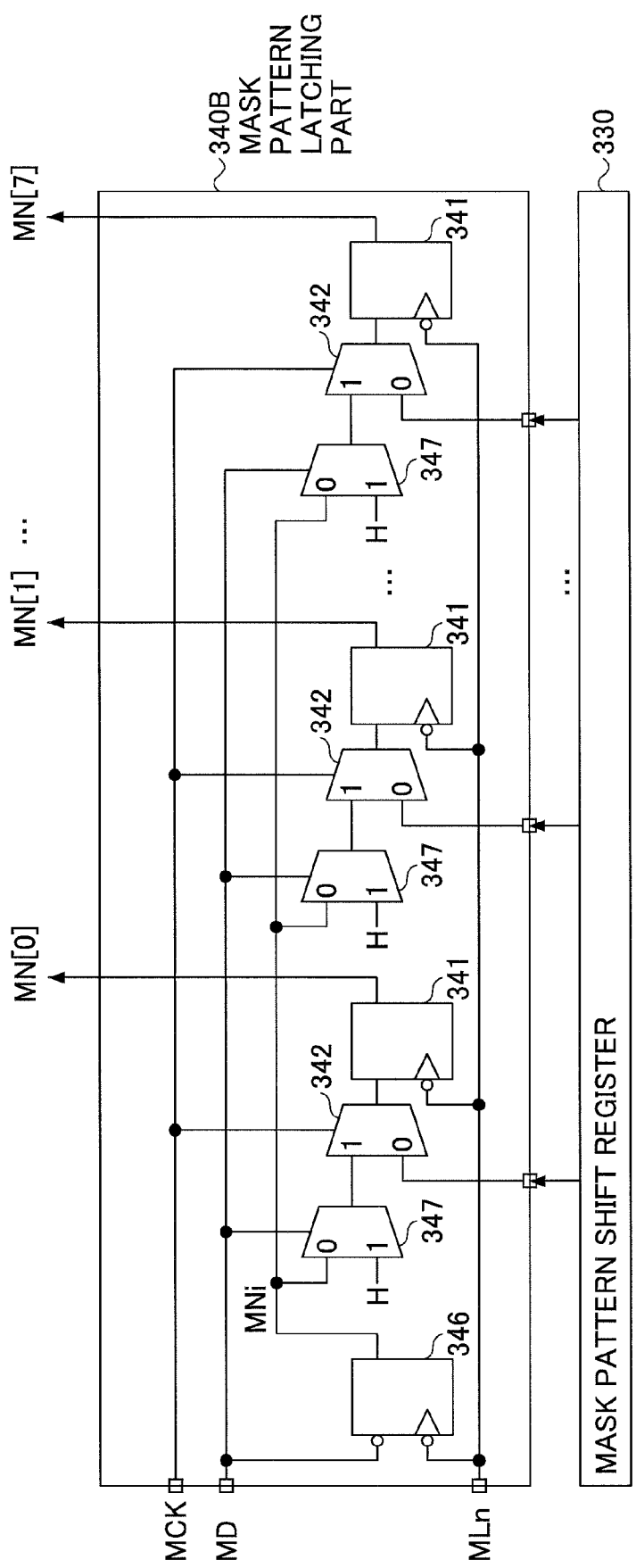
FIG. 17 is a diagram illustrating a mask pattern latching part according to a third embodiment.

FIG. 17 is a diagram illustrating a mask pattern latching part 340B. The mask pattern latching part 340B may replace the mask pattern latching part 340 (FIG. 8) of the first embodiment.

The mask pattern latching part 340B includes the flip-flop circuits 341, a flip-flop circuit 346, the multiplexers 342, and multiplexers 347. The mask pattern transfer data MD and the mask pattern transfer data latch signal MLn are input to the flip-flop circuit 346. The flip-flop circuit 346 outputs the mask pattern transfer data MD as the MNi signal, which is the inverted signal of the mask pattern transfer data MD and is input to the multiplexers 347.

The multiplexers 347 have respective first inputs provided with the MNi signal, which is the output of the flip-flop circuit 346, and have respective second inputs fixed to H-level. The mask pattern transfer data MD serves as a selection signal for the multiplexers 347.

FIG. 18 illustrates a truth table of signals of the mask pattern latching part 340B according to the third embodiment.

According to this embodiment, the mask pattern latching part 340B stores the MNi signal as L-level when the status of the mask pattern transfer data MD at the time of latching, when the mask pattern transfer clock signal MCK is L-level and the mask pattern transfer data latch signal MLn is L-level, is H-level. Further, the mask pattern latching part 340B stores the MNi signal as H-level when the status of the mask pattern transfer data MD at the time of latching, when the mask pattern transfer clock signal MCK is L-level and the mask pattern transfer data latch signal MLn is L-level, is L-level.

Further, according to this embodiment, the mask pattern latching part 340B resets the mask pattern signals MN[7:0] to ALL-H when the mask pattern transfer clocks signal MCK is H-level, the mask pattern transfer data latching signal MLn is L-level, and the status of the mask pattern transfer data MD is H-level. Further, according to this embodiment, the mask pattern latching part 340B resets all of the mask pattern signals MN[7:0] to the value of the MNi signal when the mask pattern transfer clocks signal MCK is H-level, the mask pattern transfer data latching signal MLn is L-level, and the status of the mask pattern transfer data MD is L-level.

Figure 19A:
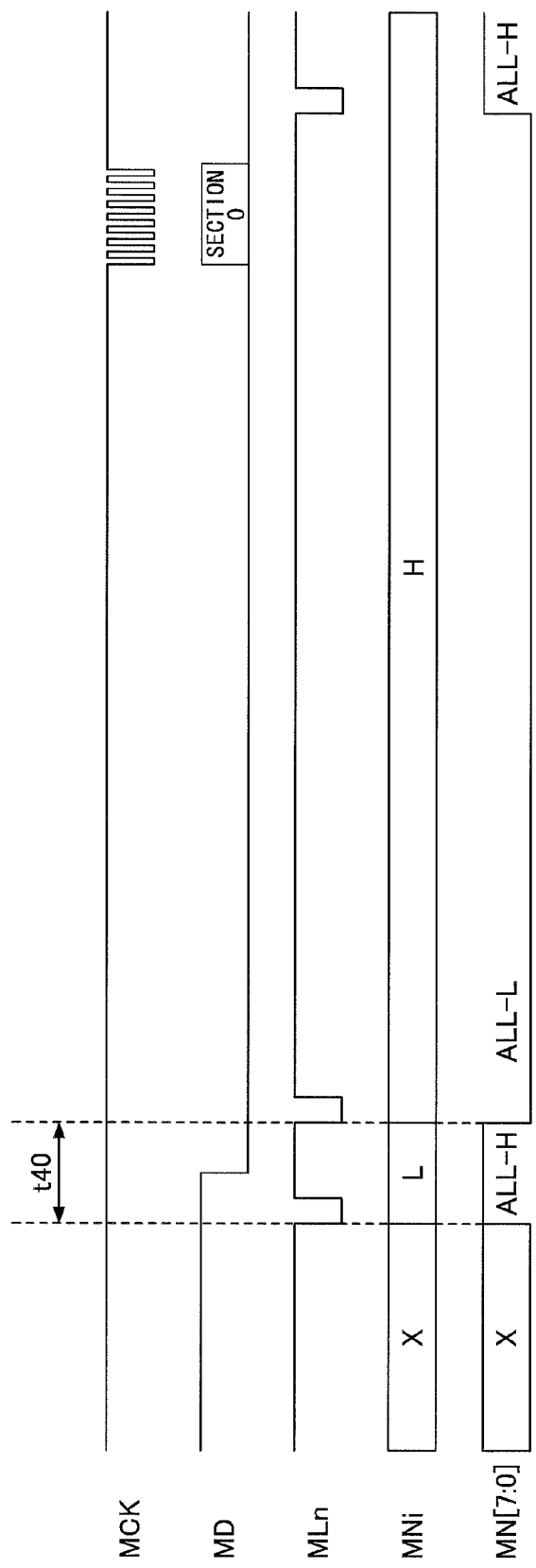
FIGS. 19A and 19B are timing charts of signals illustrating timings of data transfer from a recording head control part to a recording head driving part according to the third embodiment.
Figure 19B:
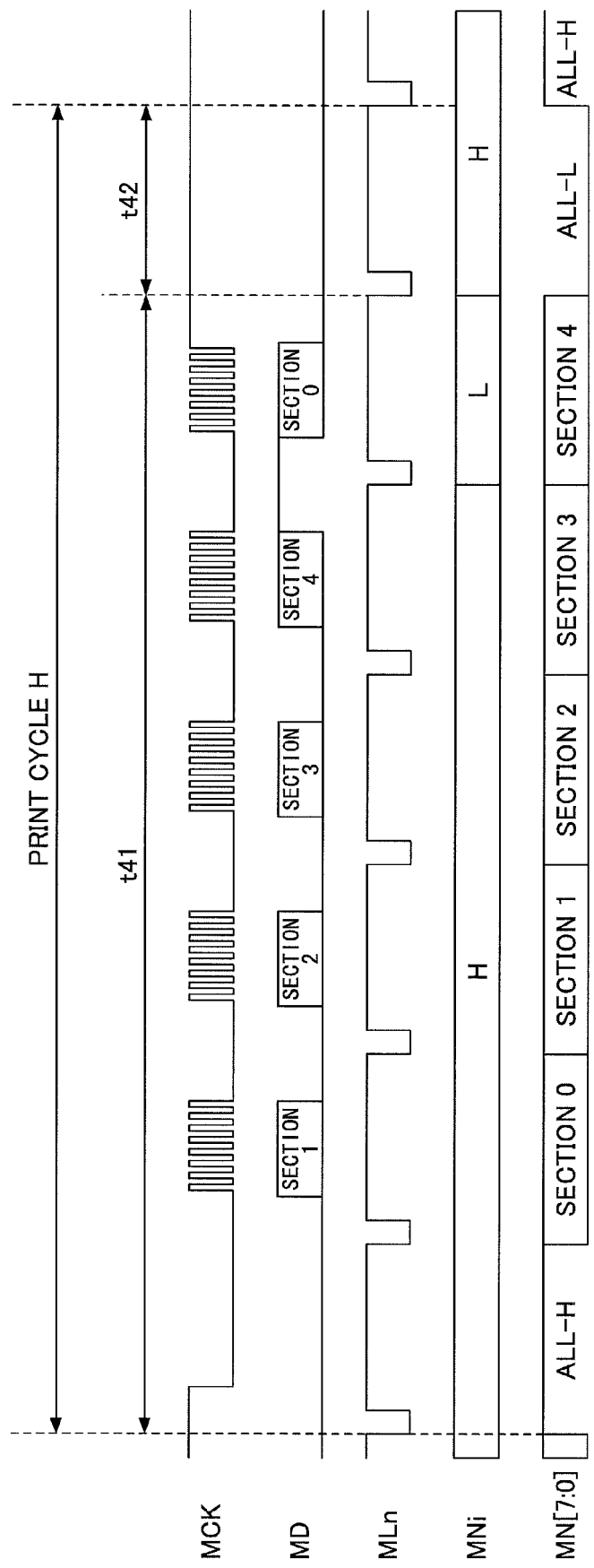

FIGS. 19A and 19B are timing charts of signals illustrating timing of data transfer from the recording head control part 500 (FIG. 8) to the recording head driving part 300 (FIG. 8) according to the third embodiment. FIG. 19A illustrates a case of data transfer, and FIG. 19B illustrates another case of data transfer.

According to this embodiment, the inverted value (level) of the mask pattern transfer data MD at the time of latching is stored as the MNi signal. Accordingly, in the case of resetting the mask pattern signals MN[7:0] to ALL-L after initializing the mask pattern signals MN[7:0] to ALL-H, Period t40 in FIG. 19A can be shortened the same as Period t10 of the first embodiment (FIG. 11A).

Further, as illustrated in FIG. 19B, the mask pattern signals MN[7:0] are reset to ALL-L upon completion of a transfer in Period t41, which is a period for transferring the mask pattern transfer data MD.

According to this embodiment, the mask pattern latching part 340B maintains the status of the mask pattern transfer data MD at H-level between the completion of transfer of Section 4 data and the start of transfer of Section 0 data in transferring the mask pattern transfer data MD. As a result, the mask pattern latching part 340B retains the L-level inverted value of the mask pattern transfer data MD at the time of latching, when the mask pattern transfer data latch signal MLn is L-level, as the MNi signal.

Therefore, the mask pattern latching part 340B resets the mask pattern signals MN[7:0] to L-level, which is the value of the MNi signal, in the case of resetting the mask pattern signals MN[7:0] to other than ALL-H after completion of Period t41.

Further, the mask pattern signals MN[7:0] are reset again to ALL-H after the mask pattern signals MN[7:0] are reset to ALL-L and the print cycle H ends.

In Period t42 starting immediately after the mask pattern signals MN[7:0] are reset to ALL-L, the status of the mask pattern transfer data MD is L-level so that the mask pattern latching part 340B retains the H-level value as the MNi signal. That is, the next time the mask pattern latching part 340B resets the mask pattern signals MN[7:0], the mask pattern latching part 340B resets the mask pattern signals MN[7:0] to ALL-H from the value of the MNi signal without the status of the mask pattern transfer data MD at the time of latching being H-level.

According to this embodiment, when the mask pattern signals MN[7:0] are reset again to ALL-H after the print cycle H ends, the mask pattern signals MN[7:0] are reset to ALL-H using the value of the MNi signal instead of causing the status of the mask pattern transfer data MD to be H-level. According to this embodiment, the above-described configuration eliminates the necessity of a period for setting the status of the mask pattern transfer data MD to H-level, thus making it possible to have a longer margin period relative to the print cycle H than in the first embodiment.

Thus, according to this embodiment, in a data transfer from the apparatus body side to the recording head side, it is possible to ensure a sufficient margin for a print cycle and to improve the stability of ejection of ink droplets.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An image forming apparatus forming an image by causing liquid droplets to be ejected from a plurality of nozzles of a recording head based on image data, the image forming apparatus comprising:
   a recording head driving part configured to drive the recording head;
   a common driving signal generation part configured to generate a common driving signal; and
   a data transfer part configured to transfer the image data and control data to the recording head driving part,
   wherein the recording head driving part includes
      a storage part configured to capture, in synchronization with a mask pattern transfer clock signal, mask pattern transfer data to mask a predetermined one or more of a plurality of different driving signals of the common driving signal provided by the common driving signal generation part, the mask pattern transfer data being included in the control data; and
      a mask pattern latching part configured to latch the mask pattern transfer data and generate a mask pattern signal to mask the common driving signal, and to selectively perform one of a plurality of control operations other than latching on the mask pattern transfer data stored in the storage part, based on a combination of a value of the mask pattern transfer data and a value of the mask pattern transfer clock signal, when the mask pattern latching part is caused to enter a latching state.

2. The image forming apparatus as claimed in claim 1, wherein:
the mask pattern latching part is configured to latch the mask pattern transfer data stored in the storage part if the value of the mask pattern transfer clock signal is different from an initial value thereof when the mask pattern latching part is caused to enter the latching state, and
the mask pattern latching part is configured to selectively perform the one of the control operations other than the latching on the mask pattern transfer data if the value of the mask pattern transfer clock signal is equal to the initial value thereof when the mask pattern latching part is caused to enter the latching state.

3. The image forming apparatus as claimed in claim 2, wherein the control operations include a first resetting operation of resetting the mask pattern signal to a first value and a second resetting operation of resetting the mask pattern signal to a second value.

4. The image forming apparatus as claimed in claim 3, wherein the first value and the second value include a predetermined reset value and the value of the mask pattern transfer data when the mask pattern latching part is caused to enter the latching state.

5. The image forming apparatus as claimed in claim 3, wherein the mask pattern latching part is configured to perform the first resetting operation at a time of initializing the mask pattern signal and to perform the second resetting operation upon completion of outputting the mask pattern signal.

6. The image forming apparatus as claimed in claim 3, wherein the mask pattern latching part is configured to perform one of the first resetting operation and the second resetting operation and output a corresponding one of the first value and the second value as the mask pattern signal in a predetermined period during a transfer of the mask pattern transfer data.

7. The image forming apparatus as claimed in claim 3, wherein if a value of a first section of the mask pattern transfer data is one of the first value and the second value, the mask pattern latching part performs one of the first resetting operation and the second resetting operation corresponding to the one of the first value and the second value before or after transferring a second section of the mask pattern transfer data subsequent to the first section.

8. The image forming apparatus as claimed in claim 1, wherein the control operations include switching a system of a data transfer from the data transfer part to the recording head driving part.

9. A method of forming an image by causing liquid droplets to be ejected from a plurality of nozzles of a recording head based on image data, the method comprising:
generating a common driving signal and providing a recording head driving part configured to drive the recording head with the generated common driving signal;
transferring the image data and control data to the recording head driving part;
capturing, in synchronization with a mask pattern transfer clock signal, mask pattern transfer data to mask a predetermined one or more of a plurality of different driving signals of the common driving signal, the mask pattern transfer data being included in the control data, and storing the captured mask pattern transfer data in a storage part of the recording head driving part;
latching the mask pattern transfer data and generating a mask pattern signal to mask the common driving signal; and
selectively performing one of a plurality of control operations other than latching on the mask pattern transfer data stored in the storage part, based on a combination of a value of the mask pattern transfer data and a value of the mask pattern transfer clock signal, when a latching state is entered.

10. A non-transitory computer-readable recording medium in which a program for causing a computer to execute a method of forming an image by causing liquid droplets to be ejected from a plurality of nozzles of a recording head based on image data is recorded, the method comprising:
generating a common driving signal and providing a recording head driving part configured to drive the recording head with the generated common driving signal;
transferring the image data and control data to the recording head driving part;
capturing, in synchronization with a mask pattern transfer clock signal, mask pattern transfer data to mask a predetermined one or more of a plurality of different driving signals of the common driving signal, the mask pattern transfer data being included in the control data, and storing the captured mask pattern transfer data in a storage part of the recording head driving part;
latching the mask pattern transfer data and generating a mask pattern signal to mask the common driving signal; and
selectively performing one of a plurality of control operations other than latching on the mask pattern transfer data stored in the storage part, based on a combination of a value of the mask pattern transfer data and a value of the mask pattern transfer clock signal, when a latching state is entered.

* * * * *